United States Patent [19]

Morisawa

[11] Patent Number: 4,537,092
[45] Date of Patent: Aug. 27, 1985

[54] TRANSVERSE TYPE AUTOMATIC TRANSMISSION WITH THROUGH LAY SHAFT

[75] Inventor: Kunio Morisawa, Okazaki, Japan

[73] Assignee: Toyota Jidosha Kabushiki Kaisha, Toyota, Japan

[21] Appl. No.: 418,026

[22] Filed: Sep. 14, 1982

[30] Foreign Application Priority Data

Sep. 17, 1981 [JP] Japan .................. 56-147436

[51] Int. Cl.³ .................. F16H 37/08; F16H 37/00; F16H 57/10
[52] U.S. Cl. .................. 74/695; 74/740; 74/763
[58] Field of Search .............. 74/701, 695, 730, 740, 74/694, 762, 763, 674

[56] References Cited

U.S. PATENT DOCUMENTS

| | | | |
|---|---|---|---|
| 4,056,988 | 11/1977 | Kubo et al. | 74/695 |
| 4,342,238 | 8/1982 | Gardner | 74/740 X |
| 4,346,622 | 8/1982 | Pierce | 74/740 X |
| 4,364,285 | 12/1982 | Morisawa et al. | 74/695 X |

FOREIGN PATENT DOCUMENTS

| | | | |
|---|---|---|---|
| 0080082 | 6/1983 | European Pat. Off. | 74/695 |
| 0111050 | 8/1979 | Japan | 74/695 |
| 0039346 | 4/1981 | Japan | 74/740 |
| 0129953 | 8/1982 | Japan | 74/695 |
| 0173641 | 10/1982 | Japan | 74/695 |
| 0190152 | 11/1982 | Japan | 74/695 |
| 0208340 | 12/1982 | Japan | 74/695 |

*Primary Examiner*—Allan D. Herrmann
*Assistant Examiner*—Stephen B. Andrews
*Attorney, Agent, or Firm*—Stevens, Davis, Miller & Mosher

[57] ABSTRACT

An automatic transmission includes a fluid torque converter and a first and a second gear transmission mechanism each of which has two coaxial drive members - a power input member and a power output member - and is selectable to any one of several speed ratios. Rotational power is output from the fluid torque converter to the first gear transmission mechanism. The torque converter, and the first gear transmission mechanism including the power input and output members thereof, are all coaxial on a first axis. A through lay shaft extends along a second axis parallel to the first axis, and passes through the second gear transmission mechanism, whose power input and output members are also coaxial on the second axis, so as to support these. A rotational power transfer mechanism transfers rotational power between the power output member of the first gear transmission mechanism and the power input member of the second gear transmission mechanism.

3 Claims, 2 Drawing Figures

1 …

TRANSVERSE TYPE AUTOMATIC TRANSMISSION WITH THROUGH LAY SHAFT

BACKGROUND OF THE INVENTION

The present invention relates to a transmission for an automotive vehicle, and in particular relates to an automatic type transmission particularly suitable for use in a transverse front engine front wheel drive type automotive vehicle, or a so called FF vehicle.

There is a known type of front engine type front wheel drive type automotive vehicle in which the internal combustion engine thereof is mounted transversely to the vehicle body, with its crankshaft extending at right angles to the longitudinal axis of the automotive vehicle body, and in which the automatic transmission thereof is attached to the internal combustion engine with the directions of the rotational axes of the various mechanisms contained therein likewise extending transversely to the longitudinal axis of the vehicle body. In such a transverse type of construction, it is very important to keep the axial length of the automatic transmission as short as possible, so as to fit the transmission mechanism and the rotary power train of the vehicle as a whole into the shortest possible space, in view of the severe restriction imposed on the axial length of this rotary power train by the overall width of the vehicle, within which of course the rotary power train must be accomodated.

There is a well known per se form of transmission which has been evolved as suitable for such transverse mounting, in which a fluid torque converter is mounted to the internal combustion engine and is placed coaxially with said engine and with a gear transmission mechanism along a first axis and drives said gear transmission mechanism, and in which the rotary power output from said gear transmission mechanism is transferred sideways from said first axis to a lay shaft which extends along a second axis parallel to said first axis back under the gear transmission mechanism to a point approximately under the torque converter, where this engine side end of the lay shaft is rotationally connected to a differential device appropriate for a front wheel drive configuration.

This configuration of automatic transmission has been successfully implemented in the past, but owing to the limited space available along said first axis for providing said gear transmission mechanism the design process, manufacture, assembly, and servicing therefore have been rather difficult. Further, in line with the ever increasing requirements for smaller and smaller automotive vehicles, there has been recently a need to adapt these automatic transmissions to vehicles having even smaller widths than heretofore, which has been very difficult, in view of the problems in design, manufacture, assembly, and servicing outlined above.

Also, in the construction of such an automatic transmission, the compactness in the directions sideways from the axial direction described above which is transverse to the vehicle axis is important; in other words, it is important that the transmission not be too fat; and more particularly it is important that there not be too much of a bulge created by providing space within the transmission for accomodating the gear train which is necessarily provided for driving the above described lay shaft from the power output member of the gear transmission mechanism. The reduction of such a bulge, especially of the bulge at the lower side of the transmission around the end of the lay shaft, is important in view of the problem of interference between such a bulge and the drive shaft which drives the front wheel on that side of the automotive vehicle, which sometimes presents a problem.

Further, in the past, difficulties have been experienced with regard to making the transmission, and particularly the internal construction thereof, strong enough to be durable over a long period of time; in particular the lay shaft structure has experienced problems with regard to strength, which have affected its durability. The weight of the transmission as a whole, and the weight of the lay shaft structure in particular, also in some cases are critical design factors with regard to such a transmission. Finally, the question of noise produced by the gears in such a transmission, and in particular the question of the noise produced by the lay shaft assembly, is important from the point of view of producing a transmission which is environmentally acceptable, as well as being easy and pleasant of operation by the driver of the vehicle, especially over a long period. This has importance with regard to questions of drivability of the vehicle as a whole. These questions of noise, and of durability, are related to the desire to simplify the bearing structure of such a lay shaft construction.

SUMMARY OF THE INVENTION

Accordingly, it is the primary object of the present invention to provide an automatic transmission whose axial length is minimized, and which is thus particularly suitable for incorporation into a transverse front engine type front wheel drive type automotive vehicle.

It is a further object of the present invention to provide an automatic transmission for an automotive vehicle, in which the axial length of the rotary power train as a whole is minimized.

It is a further object of the present invention to provide an automatic transmission for an automotive vehicle, which can be applied conveniently to vehicles having even smaller widths than heretofore.

It is a further object of the present invention to provide an automatic transmission for an automotive vehicle, which has good design characteristics.

It is a further object of the present invention to provide an automatic transmission for an automotive vehicle, which is easy to manufacture.

It is a further object of the present invention to provide an automatic transmission for an automotive vehicle, which is cheap to manufacture.

It is a further object of the present invention to provide an automatic transmission for an automotive vehicle, which is easy to assemble.

It is a further object of the present invention to provide an automatic transmission for an automotive vehicle, which is easy to service after installation in said automotive vehicle.

It is a further object of the present invention to provide an automatic transmission for an automotive vehicle, which is compact.

It is yet a further object of the present invention to provide an automatic transmission for an automatic vehicle, which is strong.

It is yet a further object of the present invention to provide an automatic transmission for an automotive vehicle, which is durable during use.

It is yet a further object of the present invention to provide an automatic transmission for an automotive vehicle, in which the overall weight is reduced.

It is yet a further object of the present invention to provide an automatic transmission for an automotive vehicle, incorporating such a lay shaft assembly as described above, in which the lay shaft assembly is particularly durable.

It is yet a further object of the present invention to provide an automatic transmission for an automotive vehicle, incorporating such a lay shaft assembly, in which the support of the lay shaft assembly is particularly rigid.

It is yet a further object of the present invention to provide an automatic transmission for an automotive vehicle, incorporating such a lay shaft assembly, in which the occurrence of gear noise is reduced.

It is yet a further object of the present invention to provide an automatic transmission for an automotive vehicle, incorporating such a lay shaft assembly, in which particularly the occurrence of gear noise in the lay shaft assembly is reduced.

It is yet a further object of the present invention to provide an automatic transmission for an automotive vehicle, incorporating such a lay shaft assembly, in which the bulge caused on the outside of the transmission casing by the provision of the space necessary to house the gear train which drives the lay shaft is reduced as much as possible.

It is yet a further object of the present invention to provide an automatic transmission for an automotive vehicle, incorporating such a lay shaft assembly, in which particularly the lower part of said bulge caused on the outside of the transmission casing by the provision of the space necessary to house the gear train which drives the lay shaft is reduced as much as possible.

It is yet a further object of the present invention to provide an automatic transmission for an automotive vehicle, incorporating such a lay shaft assembly, in which interference caused between the lower part of said bulge caused on the outside of the transmission casing by the provision of the space necessary to house the gear train which drives the lay shaft and the drive shaft for the wheel on that side of the automotive vehicle is reduced as much as possible.

It is yet a further object of the present invention to provide an automatic transmission for an automotive vehicle, incorporating such a lay shaft assembly, in which the bearing support construction for the lay shaft is simplified as much as possible.

It is yet a further object of the present invention to provide an automatic transmission for an automotive vehicle, incorporating such a lay shaft assembly, in which the bearing support construction for the lay shaft is made as strong as possible.

It is yet a further object of the present invention to provide an automatic transmission for an automotive vehicle, which provides as environmentally good operation as possible.

It is yet a further object of the present invention to provide an automatic transmission for an automotive vehicle, which avoids, as much as possible, the risk of overrevving of the engine of the vehicle during engine braking conditions.

It is yet a further object of the present invention to provide an automatic transmission for an automotive vehicle, which provides as good drivability for the automotive vehicle to which it is fitted as possible.

According to the present invention, these and other objects are accomplished by an automatic transmission for an automotive vehicle, comprising: (a) a fluid torque converter, comprising a rotational power input member and a rotational power output member, said rotational power input member and said rotational power output member both being rotatable about a first axial line; (b) a first gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about said first axial line; said rotational power input member of said first gear transmission mechanism being rotationally connected to said rotational power output member of said fluid torque converter; (c) a second gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about a second axial line parallel to said first axial line and displaced laterally therefrom; (d) a through lay shaft which extends along and is rotatable about said second axial line, and which passes through said second gear transmission mechanism; (e) a rotational power transfer mechanism which transfers rotational power between said rotational power output member of said first gear transmission mechanism and said rotational power input member of said second gear transmission mechanism; and (f) a power output gear wheel which is supported by said lay shaft to be rotatable about said second axial line and which is drivingly connected with said rotational power output member of said second gear transmission mechanism.

According to such a structure, since the automatic transmission incorporates both the first gear transmission mechanism and the second gear transmission mechanism, the first gear transmission mechanism being provided as lying along the first axis while the second gear transmission mechanism is provided as lying along the second axis which is parallel with and displaced from the first axis, the overall construction of the automatic transmission is rendered remarkably compact, and its axial length is very greatly reduced as compared with conventional designs of the sort outlined above. Further, because the lay shaft passes through the second gear transmission mechanism, the bearing structure for this lay shaft as well as the bearing structure for the second gear transmission mechanism are as a matter of course rendered much simpler than would be the case if said lay shaft only extended on one side of said second gear transmission mechanism or were divided into two arranged on opposite sides of the second gear transmission mechanism. The increased rigidity of the support of the lay shaft can also make the transmission strong and durable during use; and, as a matter of course, reduces the gear noise caused by the oscillation of the second gear transmission mechanism, thus rendering the transmission more environmentally acceptable, and increasing the drivability of the automotive vehicle to which said transmission is fitted.

Further, according to a particular aspect of the present invention, these and other objects are more particularly and concretely accomplished by such a transmission as outlined above, wherein said rotational power transfer mechanism comprises a first gear wheel which is rotatable about said first axial line and which is rotationally connected to said rotational power output member of said first gear transmission mechanism and a second gear wheel which is meshed with said first gear wheel and which is supported by said lay shaft so as to be rotatable about said second axial line and which is rotationally connected to said rotational power input member of said second gear transmission mechanism.

According to such a structure, a compact and positive rotational power transfer mechanism between said first gear transmission mechanism rotatable about said first axial line and said second gear transmission mechanism rotatable about said second axial line is accomplished.

Further, according to a particular aspect of the present invention, these and other objects are more particularly and concretely accomplished by such a transmission as first outlined above, wherein said first gear transmission mechanism and said second gear transmission mechanism are underdrive mechanisms, and said rotational power transfer mechanism is an overdrive mechanism.

According to such a structure, a transmission having an overdrive speed stage as the highest speed stage thereof is obtained, which provides the overdrive gear ratio when the first gear transmission mechanism is set to its directly connected speed ratio and the second gear trasnmission mechanism is set to its directly connected speed ratio. Since the highest speed stage of the automatic transmission is the speed stage which typicaly will be used for the highest proportion of the operating time of the transmission, and since the directly connected speed ratio of a gear transmission mechanism is typically the speed ratio thereof during the provision of which the gear transmission mechanism is worn to the least extent and makes the least amount of noise, the feature described above implies that the automatic transmission provides an overdrive gear ratio in the most quiet and reliable operating condition. Further, when the overdrive rotational power transfer mechanism between said first gear transmission mechanism and said second gear transmission mechanism is provided by a first gear wheel which is rotatable about said first axial line and which is rotationally connected to said rotational power output member of said first gear transmission mechanism and a second gear wheel which is meshed with said first gear wheel and which is supported by said lay shaft so as to be rotatable about said second axial line and which is rotationally connected to said rotational power input member of said second gear transmission mechanism, said second gear wheel having a smaller number of teeth than said first gear wheel, the second gear wheel will be smaller than the first gear wheel, and accordingly the bulge which is required as a matter of course to be provided as formed in the transmission housing to house said second gear is smaller than would otherwise be the case. This means that the transmission as a whole is made more compact; and also when the second axis is provided as lying generally under the first axis as typically will be the case, then particularly the bulge on the lower part of the transmission due to the provision of space for housing said second gear wheel is reduced. This means that the danger of interference between this bulge and the drive shaft which drives the wheel on that side of the longitudinal axis of the vehicle is reduced or eliminated, which is very helpful from the design and assembly points of view, as well as simplifying the servicing of the automotive vehicle after assembly.

However, it is also possible to obtain a compact overdrive rotational power transfer mechanism between said rotational power output member of said first gear transmission mechanism and said rotational power input member of said second gear transmission mechanism by the use of a chain sprocket wheel mechanism, wherein the absolute diameters of the two cooperating sprocket wheels may be reduced within a practical range regardless of the distance between said first axial line and said second axial line, thereby making it possible to desirably reduce the side bulging of the transmission casing. Therefore, although such a modification is not particularly shown in the accompanying drawing, it is to be understood that such a modification is within the scope of the present invention.

Further, according to a particular aspect of the present invention, these and other objects are more particularly and concretely accomplished by a transmission as described above, wherein said power output gear wheel is rotationally fixed to said lay shaft, and said rotational power output member of said second gear transmission mechanism is rotationally connected to said lay shaft.

According to such a structure, the lay shaft which rotatably supports the entire mechanism arranged to operate about said second axial line also effectively operates to transmit the rotational power from said rotational power output member of said second gear transmission mechanism to said power output gear wheel, thereby further contributing to the stableness and compactness of the transmission.

Further, according to a particular aspect of the present invention, these and other objects are more particularly and concretely accomplished by a transmission as described above, wherein said second gear transmission mechanism comprises a planetary gear mechanism including a sun gear, a ring gear, a plurality of planetary pinions, and a carrier, said ring gear being rotationally connected with said rotational power input member of said second gear transmission mechanism, while said carrier is rotationally connected with said rotational power output member of said second gear transmission mechanism.

According to such a structure, said second gear transmission mechanism, said lay shaft, and said rotational power transfer mechanism can be assembled together in good structural harmony so as to provide a compact and stable transmission.

Further, according to a particular aspect of the present invention, these and other objects are more particularly and concretely accomplished by a transmission as described above, wherein said rotational power input member of said second gear transmission mechanism is a hollow member through which said lay shaft passes, while said rotational power output member of said second gear transmission mechanism includes a part of said lay shaft.

According to such a structure, said rotational power input member and said rotational power output member of said second gear transmission mechanism and said lay shaft can be assembled together in good structural harmony so as to provide a compact and stable transmission.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
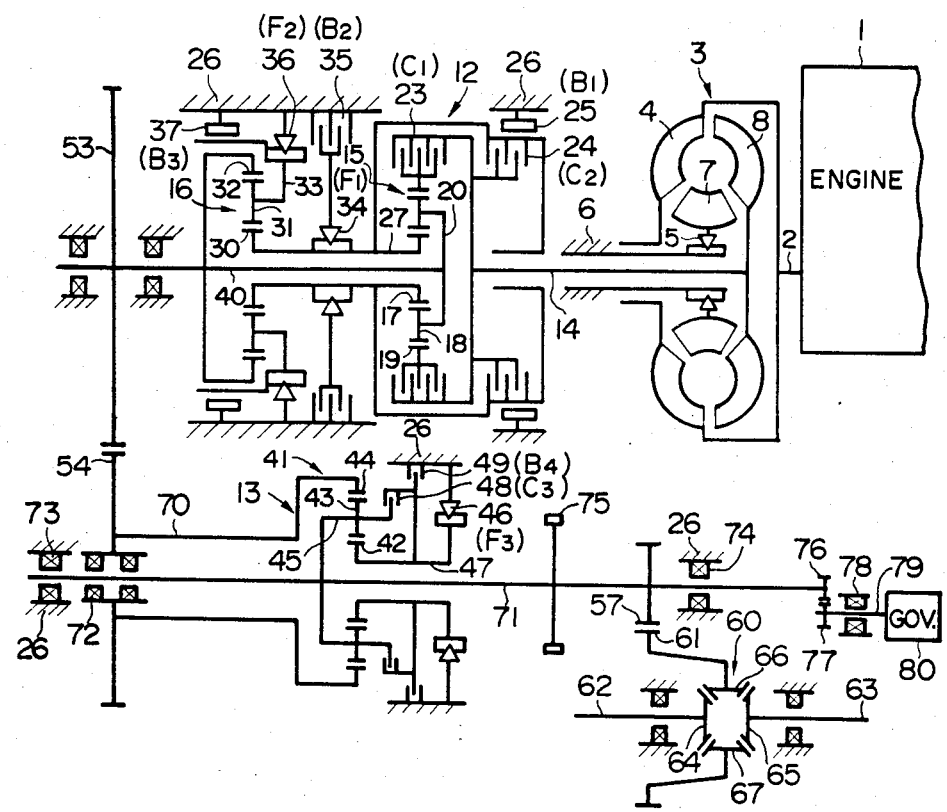
FIG. 1 is a part schematic part block diagrammatical view showing the basic layout of the fundamental mechanical elements of the preferred embodiment of the automatic transmission according to the present invention, and also showing parts of an internal combustion engine and of a differential device which are used therewith.

The present invention will now be described with reference to a preferred embodiment thereof, and with reference to the appended drawings. FIG. 1 shows schematically the mechanical construction of this preferred embodiment. In this figure, the reference numeral 1 denotes an internal combustion engine of an automotive vehicle not shown in the drawings. This internal combustion engine 1 produces output rotational power at the left hand end in the figure of its crankshaft 2 which is its rotational power output member, according to the depression of an accelerator pedal or the like which is adapted to be depressed by the foot or the like of the driver of the vehicle, the amount of said depression controlling the load on the internal combustion engine 1. This left hand end in the figure of said crankshaft 2 is rotationally connected to the pump impeller 4 of a fluid torque converter 3, which is the rotational power input member thereof.

The fluid torque converter 3 is of a per se well known type, and comprises the aforesaid pump impeller 4, a stator member 7 which is mounted via a one way brake 5 to a fixed portion 6 of the housing of the fluid torque converter 3, and a turbine member 8. The pump impeller 4, the stator member 7, and the turbine member 8 together form a toroidal fluid circulation path system, around which hydraulic fluid, which fills the interior of the casing (not shown) of the fluid torque converter 3, circulates in the general pattern of a smoke ring, thereby transferring torque between the pump impeller 4 and the turbine member 8 in a per se well known manner. The turbine member 8 is connected to the right hand end in the figure of a first shaft 14, which serves as a rotational power output shaft for the fluid torque converter 3.

This first shaft 14 also serves as a rotational power input shaft for a first gear transmission mechanism 12. The first gear transmission mechanism 12 comprises two planetary gear mechanisms, a first planetary gear mechanism 15 to which said first shaft 14 is rotationally coupled as will be seen hereinafter and a second planetary gear mechanism 16, said two planetary gear mechanisms 15 and 16 being arranged as coaxial with one another and with said first shaft 14 (the common axis thereof being hereinafter referred to as the first axis) and spaced apart in the axial direction. And the first gear transmission mechanism 12 also comprises a second shaft 40, which is also coaxial with said first axis and which extends out from the secondary planetary gear mechanism 16 to the left in the figure, i.e. to the opposite side thereof from the first shaft 14, said second shaft 40 serving as a rotational power output shaft for the first gear transmission mechanism 12. In broad functional terms, the first gear transmission mechanism 12 is an underdrive mechanism, which according to selective supply of actuating hydraulic fluid pressures to various ones of a plurality of friction engaging mechanisms which will be explained in detail in the following provides any one of a plurality of speed ratios between its rotational power input member (the first shaft 14) and its rotational power output member (the second shaft 40), including a directly connected speed ratio and a reverse speed ratio, all of said speed ratios except said directly connected speed ratio being reduction speed ratios in which the rotational power output member of the first gear transmission mechanism 12, i.e. the second shaft 40, rotates more slowly than does the rotational power input member of the first gear transmission mechanism 12, i.e. the first shaft 14.

The first planetary gear mechanism 15 of the first gear transmission mechanism 12 comprises a sun gear 17 and a ring gear 19, both of which are rotationally mounted coaxially with said first axis, and further comprises a planetary pinion 18, which is rotationally mounted to a carrier 20 which is also rotationally mounted coaxially with said first axis, said planetary pinion 18 being meshed between the sun gear 17 and the ring gear 19 and performing planetary motion as the carrier 20 rotates relative to the sun gear 17 between said sun gear 17 and the ring gear 19 in a per se well known way. In fact, of course, in practice several such planetary pinions as the planetary pinion 18 are provided between the sun gear 17 and the ring gear 19 as rotationally mounted to the carrier 20. The sun gear 17 is rotationally coupled to the right hand end in the figure of an intermediate hollow shaft 27, and the carrier 20 is rotationally coupled to the right hand end in the figure of the aforesaid second shaft 40. The ring gear 19 is capable of being selectively coupled to the first shaft 14 via a first clutch 23 or $C_1$, which is a hydraulic fluid pressure actuated clutch of a per se well known sort which is engaged by supply of hydraulic fluid pressure to a pressure chamber thereof (not shown) and is otherwise disengaged, and the sun gear 17 is similarly selectively couplable (via the intermediate hollow shaft 27) to the first shaft 14 via a second clutch 24 or $C_2$, which is also a hydraulic fluid pressure actuated clutch of a per se well known sort which is engaged by supply of hydraulic fluid pressure to a pressure chamber thereof (not shown) and is otherwise disengaged. Further, the sun gear 17 is similarly capable of being selectively coupled (via the intermediate hollow shaft 27) to the housing of the transmission, denoted by the reference numeral 26 and partially shown, via a first brake 25 or $B_1$, which is a hydraulic fluid pressure actuated brake of a per se well known sort which is engaged by supply of hydraulic fluid pressure to a pressure chamber thereof (also not shown) and is otherwise disengaged.

The second planetary gear mechanism 16 of the first gear transmission mechanism 12 comprises a sun gear 30 and a ring gear 32, both of which are rotationally mounted coaxially with said first axis, and further comprises a planetary pinion 31, which is rotationally mounted to a carrier 33 which is also rotationally mounted coaxially with said first axis, said planetary pinion 31 being meshed between the sun gear 30 and the ring gear 32 and performing planetary motion as the carrier 33 rotates relative to the sun gear 30 between said sun gear 30 and the ring gear 32 in a per se well known way. In fact, of course, in practice several such planetary pinions as the planetary pinion 31 are provided between the sun gear 30 and the ring gear 32 as rotationally mounted to the carrier 33. The sun gear 30 is rotationally coupled to the left hand end in the figure of the intermediate hollow shaft 27, and the ring gear 32 is rotationally coupled to and is mounted on an intermediate part of the second shaft 40 and is thus rotationally coupled to the carrier 20 of the first planetary gear mechanism 15. The intermediate hollow shaft 27 and the sun gear 17 of the first planetary gear mechanism 15 and the sun gear 30 of the second planetary gear mechanism 16 are selectively rotationally coupled in one rotational direction only to the housing 26 of the transmission via the series combination of a first one way clutch 34 or $F_1$ and a second brake 35 or $B_2$, which is again a hydraulic fluid pressure actuated brake of a per se well known sort which is engaged by supply of hydraulic fluid pressure to a pressure chamber thereof (also not shown) and is otherwise disengaged. The carrier 33 is always rotationally coupled in one rotational direction only to the housing 26 of the transmission via a second one way brake 36 or $F_2$, and is also selectively coupled in both rotational directions to said housing 26 of the transmission via a third brake 37 or $B_3$, which is again a hydraulic fluid pressure actuated brake of a per se well known sort which is engaged by supply of hydraulic fluid pressure to a pressure chamber thereof (also not shown) and is otherwise disengaged.

On the left hand end in the figure of the second shaft 40 there is fixedly mounted a gear wheel 53, which serves as a power output gear for the first gear transmission mechanism 12. As schematically shown on either side of this gear wheel 53 in the figure, there are provided a pair of bearings for rotatably supporting the second shaft 40 (from the casing 26 of the transmission, although this is not explicitly shown), one on each side of the gear wheel 53. With this gear wheel 53 there is constantly meshed another gear wheel 54, which according to a particular feature of the present invention is a smaller gear wheel, having a smaller number of teeth, than the gear wheel 53. This gear wheel 54 is fixedly mounted on the left hand end in the figure of a hollow shaft 70. This hollow shaft 70 extends along a second axis which lies below and parallel to the above-mentioned first axis along which the first gear transmission mechanism 12 including the first and second planetary gear mechanisms 15 and 16 is arranged, and this hollow shaft 70 serves as a rotational power input shaft for a second gear transmission mechanism 13. As schematically shown on either side of this gear wheel 54 in the figure, there are provided a pair of bearings for rotatably supporting the hollow shaft 70 from a lay shaft 71 which will be described later, one on each side of the gear wheel 54.

The second gear transmission mechanism 13 comprises a third planetary gear mechanism 41 to which said hollow shaft 70 is rotationally coupled as will be seen hereinafter, and also comprises a lay shaft 71, which is also coaxial with said second axis and which passes right through the third planetary gear mechanism 41, its left hand end in the figure extending as explained above through the gear wheel 54 and rotatably supporting said gear wheel 54, and its right hand end as seen in the figure extending out to the right of the third planetary gear mechanism 41 in the figure, i.e. to the opposite side thereof from the gear wheel 54, this end of said lay shaft 71 serving as a rotational power output shaft for the second gear transmission mechanism 13. In broad functional terms, the second gear transmission mechanism 13 is also, like the first gear transmission mechanism 12, an underdrive mechanism, which according to selective supply of actuating hydraulic fluid pressures to various ones of a plurality of friction engaging mechanisms which will be explained in detail in the following provides any one of a plurality of speed ratios (which actually are two in number) between its rotational power input member (the hollow shaft 70) and its rotational power output member (the lay shaft 71), including a directly connected speed ratio, all of said speed ratios except said directly connected speed ratio being reduction speed ratios in which the rotational power output member of the second gear transmission mechanism 13, i.e. the lay shaft 71, rotates more slowly than does the rotational power input member of the second gear transmission mechanism 13, i.e. the hollow shaft 70.

The third planetary gear mechanism 41 of the second gear transmission mechanism 13 comprises a sun gear 42 and a ring gear 44, both of which are rotationally mounted coaxially with said second axis, and further comprises a planetary pinion 43, which is rotationally mounted to a carrier 45 which is also rotationally mounted coaxially with said second axis, said planetary pinion 43 being meshed between the sun gear 42 and the ring gear 44 and performing planetary motion as the carrier 45 rotates relative to the sun gear 42 between said sun gear 42 and the ring gear 44 in a per se well known way. In fact, of course, in practice several such planetary pinions as the planetary pinion 43 are provided between the sun gear 42 and the ring gear 44 as rotationally mounted to the carrier 45. The sun gear 42 is rotationally coupled to the right hand end in the figure of a sun gear shaft 47, and the carrier 45 is rotationally coupled to an intermediate portion of the aforesaid lay shaft 71. The ring gear 44 is rotationally fixed to the right hand end in the figure of the hollow shaft 70, and is also capable of being selectively rotationally coupled to the sun gear shaft 47 of the sun gear 42 via a third clutch 48 or $C_3$, which is again a hydraulic fluid pressure actuated clutch of a per se well known sort which is engaged by supply of hydraulic fluid pressure to a pressure chamber thereof (not shown) and is otherwise disengaged, and the sun gear 42 is similarly capable of being selectively rotationally coupled (via the sun gear shaft 47) to the housing 26 of the transmission via a fourth brake 49 or $B_4$, which is also a hydraulic fluid pressure actuated clutch of a per se well known sort which is engaged by supply of hydraulic fluid pressure to a pressure chamber thereof (not shown) and is otherwise disengaged. Further, the sun gear 42 is also always rotationally coupled in one rotational direction only via the sun gear shaft 47 to the housing 26 of the transmission via a third one way brake 46 or $F_3$, in such a sense that as long as the internal combustion engine 1 is urging the automotive vehicle along the road, i.e. is not in the overrunning operational condition, the sun gear 42 is rotationally coupled to the housing 26 of the transmission, even when the hydraulically actuated brake 49 or $B_4$ is disengaged.

The lay shaft 71, which as mentioned above serves as a rotational power output shaft for the second gear transmission mechanism 13, extends along said second axis right through the third planetary gear mechanism 41, its left hand end in the figure extending as explained above through the gear wheel 54 and rotatably supporting said gear wheel 54, and its right hand end as seen in the figure extending towards the side of the internal combustion engine 1 of the third planetary gear mechanism 41 and having fixedly mounted on it in the specified order as proceeding from said third planetary gear mechanism 41: a parking lock gear 75 whose function will be explained later, a power output gear 57 for driving a differential device 60 and for thus serving as a power output gear of the second gear transmission mechanism 13, and a governor valve driving gear 76. This lay shaft 71 is rotatably supported from the housing 26 of the transmission by two bearings 73 and 74, which are fitted at substantially the left and right hand ends in the figure of said lay shaft 71.

Thus, because the second gear transmission mechanism 13 is supported on the lay shaft 71 which is formed as an integral shaft which extends right through said second gear transmission mechanism 13 and through the gear wheel 54 as well, and because said lay shaft 71 is well supported by being supported substantially at each of its ends by the two bearings 73 and 74, thereby the constructon of this transmission is durable, rigid, and strong. This allows the weight of the lay shaft 71 to be reduced as compared with the weight of corresponding members in other transmission designs, and also allows of the reduction of gear noise within the automatic transmission.

Because the first gear transmission mechanism 12 and the second gear transmission mechanism 13 are both constructed as underdrive mechanisms, each of these gear transmission mechanisms according to selective supply of actuating hydraulic fluid pressures to various ones of a plurality of friction engaging mechanisms comprised in it providing any one of a plurality of speed ratios between its rotational power input member and its rotational power output member including a directly connected speed ratio, all of said speed ratios except said directly connected speed ratio being reduction speed ratios in which the rotational power output member of said gear transmission mechanism rotates more slowly than does the rotational power input member of said gear transmission mechanism, thereby it will be easily understood that the highest speed stage of the combination of the first and the second gear transmission mechanisms 12 and 13 as linked together by the gear wheels 53 and 54 is provided when both the first gear transmission mechanism 12 is selected to its directly connected speed stage, and also the second gear transmission mechanism 13 is selected to its directly connected speed stage. In this operational condition, the ratio between the speed of the rotational power input member of the combination of the first and second gear transmission mechanisms 12 and 13, i.e. the first shaft 14, and the speed of the rotational power output member of the combination of the first and second gear transmission mechanisms 12 and 13, i.e. the lay shaft 71, is given by the ratio of the number of the teeth on the gear wheel 54 to the number of the teeth on the gear wheel 53. Typically the highest speed stage of a modern type automatic transmission is required to be a so called overdrive speed stage in which the output member of the automatic transmission rotates somewhat faster than does its input member, and according to this, as schematically shown in the figure, the number of the teeth on the gear wheel 54 will be somewhat less than the number of the teeth on the gear wheel 53. This means that the gear wheel 54 may be made smaller and more compact, than has been the case with prior art transmission designs; and this further makes for compactness and lightness of the transmission as a whole.

The parking lock gear 75 which is fixedly mounted on the lay shaft 71 is incorporated into a parking lock mechanism for the automatic transmission which is per se well known and conventional and which will not be further particularly discussed herein. The governor valve driving gear 76 which is fixedly mounted on the lay shaft 71 is engaged with a governor valve driven gear 77, which is mounted on a shaft 79 which is supported in a bearing device 78. The shaft 79 drives a governor pressure regulation valve 80 which is of a per se well known sort, and which provides a hydraulic fluid pressure which is approximately proportional to the rotational speed of the lay shaft 71, i.e. which is approximately proportional to the road speed of the vehicle incorporating this transmission system. The structure of this governor pressure regulation valve 80 will not be particularly discussed herein. The power output gear 57 which is fixedly mounted on the lay shaft 71 serves as a power output gear of the second gear transmission mechanism 13, and is permanently meshed with a ring gear 61 of a per se well known differential mechanism 60. This differential mechanism 60 is suited for a transverse front engine front wheel drive type automotive vehicle, and comprises a pair of helical gears 66 and 67 which are coaxially rotatably mounted to a carrier, not particularly shown, which also carries the ring gear 61, a pair of helical gears 64 and 65 each of which meshes with both of the helical gears 66 and 67, and a pair of axle shafts 62 and 63 each of which is rotationally coupled to one of the helical gears 64 and 65.

In Table I, which is located at the end of this specification and before the claims appended thereto, and which is to be understood as incorporated into this specification, there is shown, for each of the transmission speed stages that can be attained in each of the manually selected transmission ranges, i.e. as will be explained in what follows in "D" or drive range, in "3" or third range, in "2" or second range, in "L" or low range, and in "R" or reverse range, the engagement conditions of each of the hydraulic fluid pressure actuated friction engagement mechanisms in the first and second gear transmission mechanisms 12 and 13, i.e. of the first clutch 23 or $C_1$, of the second clutch 24 or $C_2$, of the third clutch 48 or $C_3$, of the first brake 25 or $B_1$, of the second brake 35 or $B_2$, of the third brake 37 or $B_3$, and of the fourth brake 49 or $B_4$, and the engaged or free running conditions of each of the one way clutches and brakes, i.e. of the first one way clutch 34 or $F_1$, of the second one way brake 36 or $F_2$, and of the third one way brake 46 or $F_3$. In this Table, the symbol "E" indicates that the corresponding hydraulic fluid pressure actuated friction engagement mechanism (i.e. the corresponding clutch or brake) is engaged, while the symbol "D" indicates that it is disengaged. Further, the symbol "(E)" indicates that the corresponding one way clutch or brake is engaged when the internal combustion engine 1 is urging the automotive vehicle along the road, i.e. is not in the overrunning operational condition, and that in such a case this engagement is being utilized; the symbol "e" indicates that the corresponding one way clutch or brake is engaged when the internal combustion engine 1 is urging the automotive vehicle along the road, i.e. is not in the overrunning operational condition, but that in such a case this engagement is not particularly utilized, since transmission of rotational power by the transmission is in any case ensured by the engagement of a clutch or a brake which is mounted in parallel with said one way clutch or brake; and the symbol "O" indicates that the corresponding one way clutch or brake is disengaged, whether or not the internal combustion engine 1 is urging the automotive vehicle along the road. This Table I will be utilized in what follows for explaining the operation of the control system for the automatic transmission according to the preferred embodiment of the present invention.

Figure 2:
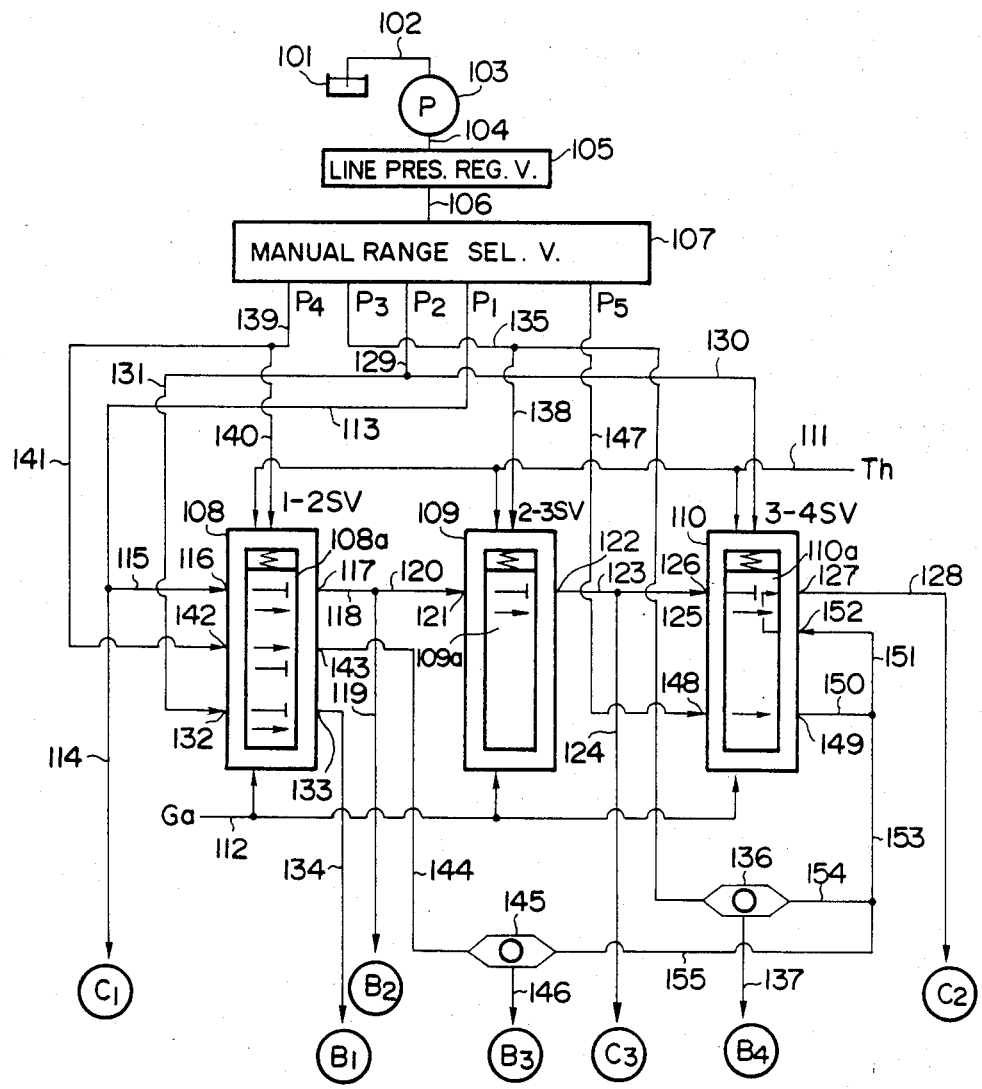
FIG. 2 is a part schematic part block diagrammatical view showing the construction of a hydraulic fluid pressure control system which is used for controlling said preferred embodiment of the automatic transmission according to the present invention the basic layout of the elements of which is shown in FIG. 1.

In FIG. 2, the hydraulic fluid pressure control system for controlling said preferred embodiment of the automatic transmission according to the present invention the basic layout of the elements of which is shown in FIG. 1 is shown in detail, as a schematic part block diagrammatical hydraulic fluid pressure circuit drawing. In a broad functional explanation, this hydraulic fluid pressure control system receives input of hydraulic fluid pressures representing three pieces of data: a hydraulic fluid pressure, the so called throttle hydraulic fluid pressure Th, representing the load on the internal combustion engine 1 or the amount of depression of the accelerator pedal of the vehicle incorporating this transmission system by the foot of a driver thereof, said accelerator pedal having been previously mentioned herein but not being shown; a hydraulic fluid pressure, the so called governor hydraulic fluid pressure Ga, representing the road speed of the vehicle incorporating this transmission system or the rotational speed of the lay shaft 71, which as mentioned above is produced by the governor pressure regulation valve 80; and a set of hydraulic fluid pressures P1, P2, P3, P4, and P5 which together represent the shifted position of a manual transmission range selection valve 107, which is only shown by a block in FIG. 2, and which is set to any one of a set of positions which represent the possible ranges of the automatic transmission, i.e. to a position representing one of "D" or drive range, "3" or third range, "2" or second range, "L" or low range, or "R" or reverse range. Further, the hydraulic fluid pressure control system selectively outputs a subset of seven hydraulic fluid pressures for controlling the seven hydraulic fluid pressure actuated friction engaging devices of the automatic transmission shown in FIG. 1, i.e. for controlling the first hydraulic fluid pressure actuated clutch 23 or $C_1$, the second hydraulic fluid pressure actuated clutch 24 or $C_2$, the third hydraulic fluid pressure actuated clutch 48 or $C_3$, the first hydraulic fluid pressure actuated brake 25 or $B_1$, the second hydraulic fluid pressure actuated brake 35 or $B_2$, the third hydraulic fluid pressure actuated brake 37 or $B_3$, and the fourth hydraulic fluid pressure actuated brake 49 or $B_4$. By thus selectively supplying hydraulic fluid pressures for controlling these friction engaging mechanisms, the hydraulic fluid pressure control system shown in FIG. 2 engages the appropriate subset of these seven friction engaging mechanisms, as shown in Table I, so as to engage the currently appropriate speed stage of the automatic transmission as a whole, in view of the current values of the throttle hydraulic fluid pressure Th and of the governor hydraulic fluid pressure Ga, i.e. of the current values of vehicle engine load and vehicle road speed, and in view of the currently selected position of the manual transmission range selection valve 107.

Now, in detail, hydraulic fluid is picked up from a hydraulic fluid reservoir 101 via a hydraulic fluid conduit 102 and is pressurized by a hydraulic fluid pump 103 and is supplied via a hydraulic fluid conduit 104 to a line pressure regulation valve 105. This line pressure regulation valve 105 regulates the pressure of the hydraulic fluid to a predetermined line pressure level, and supplies this line pressure hydraulic fluid via a hydraulic fluid conduit 106 to the manual transmission range selection valve 107, mentioned above.

The manual transmission range selection valve 107 is of a per se well known sort, and it is thus shown in FIG. 2 as a block, and its structure will not be particularly described herein. Functionally, this manual transmission range selection valve 107 is set by the hand of the driver of the vehicle to which this transmission system is fitted to any one of a set of positions which represent the possible ranges of the automatic transmission, i.e. to a position representing one of the transmission ranges "D" or drive range, "3" or third range, "2" or second range, "L" or low range, or "R" or reverse range. When the manual transmission range selection valve 107 is set to its position representing "D" or drive range, then said manual transmission range selection valve 107 outputs supply of hydraulic fluid at line pressure to a hydraulic fluid conduit 113, i.e. provides a pressure $P_1$ as shown in FIG. 2, but does not provide any of the pressures $P_2$, $P_3$, $P_4$, or $P_5$. When the manual transmission range selection valve 107 is set to its position representing "3" or third range, then said manual transmission range selection valve 107 outputs supply of hydraulic fluid at line pressure to the hydraulic fluid conduit 113 and also outputs supply of hydraulic fluid at line pressure to a hydraulic fluid conduit 129, i.e. provides pressures $P_1$ and $P_2$ as shown in FIG. 2, but does not provide any of the pressures $P_3$, $P_4$, or $P_5$. When the manual transmission range selection valve 107 is set to its position representing "2" or second range, then said manual transmission range selection valve 107 outputs supply of hydraulic fluid at line pressure to the hydraulic fluid conduit 113 and to the hydraulic fluid conduit 129, and also outputs supply of hydraulic fluid at line pressure to a hydraulic fluid conduit 135, i.e. provides pressures $P_1$, $P_2$, and $P_3$ as shown in FIG. 2, but does not provide either of the pressures $P_4$ or $P_5$. When the manual transmission range selection valve 107 is set to its position representing "L" or low range, then said manual transmission range selection valve 107 outputs supply of hydraulic fluid at line pressure to the hydraulic fluid conduit 113, to the hydraulic fluid conduit 129, and to the hydraulic fluid conduit 135, and also outputs supply of hydraulic fluid at line pressure to a hydraulic fluid conduit 139, i.e. provides pressures $P_1$, $P_2$, $P_3$, and $P_4$ as shown in FIG. 2, but does not provide the pressure $P_5$. And, finally, when the manual transmission range selection valve 107 is set to its position representing "R" or reverse range, then said manual transmission range selection valve 107 outputs supply of hydraulic fluid at line pressure to a hydraulic fluid conduit 147, i.e. provides a pressure $P_5$ as shown in FIG. 2, but does not provide any of the pressures $P_1$, $P_2$, $P_3$, or $P_4$. In Table II, which is located at the end of this specification and before the claims appended thereto, and which is to be understood as incorporated into this specification, there is shown, for each of the transmission speed ranges that can be set on the manual transmission range selection valve 107, the consequent condition of supply or of non supply of each of these hydraulic fluid pressures $P_1$, $P_2$, $P_3$, $P_4$, and $P_5$ by said manual transmission range selection valve 107. In this Table II, the symbol "X" indicates supply of a pressure, and the symbol "O" indicates non supply of a pressure.

The decision as to which speed stage of the automatic transmission should be engaged in the currently manually selected transmission range, according to the current values of the throttle hydraulic fluid pressure Th representing the load on the internal combustion engine and the governor hydraulic fluid pressure Ga representing the road speed of the vehicle incorporating this transmission system, is made according to the operation of three transmission shift valves: a first/second speed switching valve 108, which decides when it is proper to upshift from the first speed stage to the second speed stage and when it is proper to downshift from the second speed stage to the first speed stage; a second/third speed switching valve 109, which decides when it is proper to upshift from the second speed stage to the third speed stage and when it is proper to downshift from the third speed stage to the second speed stage; and a third/fourth speed switching valve 108, which decides when it is proper to upshift from the third speed stage to the fourth speed stage and when it is proper to downshift from the fourth speed stage to the third speed stage. These three speed switching valves are only schematically shown in the figure, and are all three constructed in a similar fashion: Each of the switching valves 108, 109, and 110 includes a bore formed in a housing and a valve element, respectively denoted by the reference symbols 108a, 109a, and 110a, which slides reciprocatingly in said bore between an upwardly displaced position from the point of view of the figure and a downwardly biased position from the point of view of the figure. Each of these valve elements 108a, 109a, and 110a is formed with a plurality of passages thereon, which may be annular grooves; and the side of each of the bores formed in the housing of each of the speed switching valves 108, 109, and 110 is formed with a plurality of openings or ports. The communication between the various ports of each of the speed switching valves 108, 109, and 110 is selectively controlled by the corresponding valve element 108a, 109a, and 110a, according to the up and down (in the sense of the figure) movement of said valve element in its bore and according to the matching that is thereby sometimes brought about and sometimes not brought about of the aforesaid passages on the valve element with the ports formed in the sides of the valve bore.

The valve element 108a, 109a, and 110a of each of the speed switching valves 108, 109, and 110 is moved upwards and downwards in the sense of the figure according to a balance relationship between the throttle hydraulic fluid pressure Th representing the load on the internal combustion engine, which is supplied via a hydraulic fluid conduit system 111 to a pressure chamber at the upper end of each of said speed switching valves 108, 109, and 110 as seen in the figure, and the governor hydraulic fluid pressure Ga representing the road speed of the vehicle incorporating this transmission system, which is supplied via a hydraulic fluid conduit system 112 to a pressure chamber at the lower end of said speed switching valves 108, 109, and 110 as seen in the figure, said balance relationship also including the action of a biasing compression coil spring (schematically shown in the figure) for each speed switching valve 108, 109, and 110, which biases the valve element thereof in the downwards direction in the sense of the figure with a certain particular biasing force which is appropriate to the particular speed switching valve. Thus, for each of these speed switching valves, when the throttle hydraulic fluid pressure Th representing the load on the internal combustion engine prevails, in this balance relationship, over the governor hydraulic fluid pressure Ga representing the road speed of the vehicle, then the valve element of said speed switching valve is biased to its downward position within the valve bore thereof; but, on the other hand, when the governor hydraulic fluid pressure Ga representing the road speed of the vehicle prevails, in this balance relationship, over the throttle hydraulic fluid pressure Th representing the load on the internal combustion engine, then the valve element of said speed switching valve is biased to its upward position within the valve bore thereof. The second/third speed switching valve 109 is so constructed that its valve element 109a is switched between its two switched positions at a vehicle road speed which is higher relative to a given throttle opening than the vehicle road speed at which the valve element 108a of the first/second speed switching valve 108 is arranged to be switched between its two switched positions; and the third/fourth speed switching valve 110 is so constructed that its valve element 110a is switched between its two switched positions at a vehicle road speed which is yet higher relative to a given throttle opening than said vehicle road speed at which the valve element 109a of the second/third speed switching valve 109 is arranged to be switched between its two switched positions. Further, as will be described in detail in the following, each of the speed switching valves 108, 109, and 110 is constructed so that its valve element 108a, 109a, or 110a may be positively overridingly biased to its downward position in the valve bore in the sense of the figure, irrespective of the current values of the throttle hydraulic fluid pressure Th and the governor hydraulic fluid pressure Ga, when an overriding hydraulic fluid pressure is supplied to an overriding pressure chamber (not particularly shown) at the upper end of each of said valves in the figure, i.e. at the end of the valve element of said switching valve to which the throttle hydraulic fluid pressure Th is supplied. Thus supply of such an overriding hydraulic fluid pressure to any one of the speed switching valves 108, 109, or 110 overrides the controlling effect of the relevant balance relationship between the throttle hydraulic fluid pressure Th and the governor hydraulic fluid pressure Ga on the valve element 108a, 109a, or 110a of that speed switching valve, and instead forces the valve element 108a, 109a, or 110a of that speed switching valve to its downwardly biased position as seen in the figure.

Now, the construction and the operation of the hydraulic fluid pressure transmission control system shown in FIG. 2 will be described together, as said transmission control system controls the transmission according to the preferred embodiment of the present invention which is shown with regard to its large scale architecture in FIG. 1, in each of "D" or drive range, "3" or third range, "2" or second range, "L" or low range, and "R" or reverse range, and for each speed stage available in each of said transmission ranges. In this connection, the operation of the transmission in "P" or parking range, and the operation of the transmission in "N" or neutral range, will not be particularly discussed, since the details of these operational modes are not directly relevant to an understanding of the operation of the transmission when the vehicle is moving, and in any case may easily be conceived of by one of ordinary skill in the transmission art, based upon the disclosure herein.

OPERATION IN "D" OR DRIVE RANGE

When the manual transmission range selection valve 107 is positioned by the hand of the driver of the vehicle to "D" or drive range, which is done when it is desired to drive the vehicle forwards in a normal operational mode, then, as shown in Table II, supply of the pressure $P_1$ (equal in magnitude to the line hydraulic fluid pressure) therefrom to the hydraulic fluid conduit 113, only, is made available, and the pressures $P_2$, $P_3$, $P_4$, and $P_5$ are not made available. In this case, therefore, since the pressure $P_2$ is not present in the hydraulic fluid conduit 129, no hydraulic fluid pressure is supplied via the hydraulic fluid conduit 130 to the overriding pressure chamber (not particularly shown) at the upper end of the third/fourth speed switching valve 110 in the figure, i.e. at the end of the valve element 110a of said third/fourth speed switching valve 110 to which the throttle hydraulic fluid pressure Th is supplied, and thus the relevant balance relationship between the throttle hydraulic fluid pressure Th and the governor hydraulic fluid pressure Ga on the valve element 110a of that speed switching valve is allowed to control it. Further, since the pressure $P_3$ is not present in the hydraulic fluid conduit 135, no hydraulic fluid pressure is supplied via the hydraulic fluid conduit 138 to the overriding pressure chamber (not particularly shown) at the upper end of the second/third speed switching valve 109 in the figure, i.e. at the end of the valve element 109a of said second/third speed switching valve 109 to which the throttle hydraulic fluid pressure Th is supplied, and thus the relevant balance relationship between the throttle hydraulic fluid pressure Th and the governor hydraulic fluid pressure Ga on the valve element 109a of that speed switching valve is allowed to control it. Yet further, since the pressure $P_4$ is not present in the hydraulic fluid conduit 139, no hydraulic fluid pressure is supplied via the hydraulic fluid conduit 140 to the overriding pressure chamber (not particularly shown) at the upper end of the first/second speed switching valve 108 in the figure, i.e. at the end of the valve element 108a of said first/second speed switching valve 108 to which the throttle hydraulic fluid pressure Th is supplied, and thus the relevant balance relationship between the throttle hydraulic fluid pressure Th and the governor hydraulic fluid pressure Ga on the valve element 108a of that speed switching valve is allowed to control it.

Now, further, when this "D" or drive range is selected, the hydraulic fluid pressure $P_1$ is supplied by the manual transmission range selection valve 107, via the hydraulic fluid conduit 113 and a hydraulic fluid conduit 115, to a port 116 of the first/second speed switching valve 108, and is also supplied, via a hydraulic fluid conduit 114, to the first clutch $C_1$ (i.e., 23 in FIG. 1) so as to engage it. Further, since the hydraulic fluid pressure $P_2$ is not being supplied by the manual range selection valve 107 when this "D" or drive range is selected, no hydraulic fluid pressure is supplied through the hydraulic fluid conduit 129 and through the hydraulic fluid conduit 131 to the port 132 of the first/second speed switching valve 108. Also, since the hydraulic fluid pressure $P_3$ is not being supplied by the manual range selection valve 107 when this "D" or drive range is selected, no hydraulic fluid pressure is supplied through the hydraulic fluid conduit 135 to be supplied to the shuttle valve 136 to actuate the fourth brake $B_4$ (i.e., 49 in FIG. 1) so as to engage it via the hydraulic fluid conduit 137. Yet further since the hydraulic fluid pressure $P_4$ is not being supplied by the manual range selection valve 107 when this "D" or drive range is selected, no hydraulic fluid pressure is supplied through the hydraulic fluid conduit 139 and through the hydraulic fluid conduit 141 to the port 142 of the first/second speed switching valve 108. And yet further, since the hydraulic fluid pressure $P_5$ is not being supplied by the manual range selection valve 107 when this "D" or drive range is selected, no hydraulic fluid pressure is supplied through the hydraulic fluid conduit 147 to the port 148 of the third/fourth speed switching valve 110.

THE FIRST SPEED STAGE (IN "D" RANGE)

Now, when the vehicle road speed as indicated by the value of the governor hydraulic fluid pressure Ga present in the hydraulic fluid conduit system 112 is low as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said throttle hydraulic fluid pressure Th which overcomes the action of said governor hydraulic fluid pressure Ga thereon to its downwardly biased position in the sense of FIG. 2 within the bore of said first/second speed switching valve 108. In this operational condition, as schematically indicated by the arrows and stop signs on the schematically shown valve element 108a in FIG. 2, the hydraulic fluid pressure present as explained above at the port 116 of said first/second speed switching valve 108 is intercepted by said valve element 108a, and is not transmitted to any other port of said first/second speed switching valve 108. As explained above, no other hydraulic fluid pressures are present within the system, and accordingly the only friction engaging mechanism which is supplied with actuating hydraulic fluid pressure is the first clutch $C_1$ (i.e., 23 in FIG. 1) so as to engage it. Thus, actuating hydraulic fluid pressures are supplied to the various friction engaging mechanisms of the transmission shown in FIG. 1 as shown by the first line of Table I, and, as will be understood by one of ordinary skill in the transmission art based upon the disclosure herein, the transmission is set to its first speed stage with no engine braking being available. And in this first speed stage both the first gear transmission mechanism 12 and the second gear transmission mechanism 13 are functioning in their underdrive modes, and neither of them functions in its directly connected mode.

THE SECOND SPEED STAGE (IN "D" RANGE)

Now, when the vehicle road speed as indicated by the value of the governor hydraulic fluid pressure Ga present in the hydraulic fluid conduit system 112 is somewhat higher as compared with the load on the internal combustion engine 1 as indicated by the value of the throttle hydraulic fluid pressure Th present in the hydraulic fluid conduit system 111 than in the previously explained first speed case, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said governor hydraulic fluid pressure Ga which overcomes the action of said throttle hydraulic fluid pressure Th thereon to its upwardly biased position in the sense of FIG. 2 within the bore of said first/second speed switching valve 108. In this operational condition, as again schematically indicated by the arrows and stop signs on the schematically shown valve element 108a in FIG. 2, the hydraulic fluid pressure present as explained above at the port 116 of said first/second speed switching valve 108 is transmitted past said valve element 108a to the port 117 of said first/second speed switching valve 108. From this port 117, this hydraulic fluid pressure is transmitted via a hydraulic fluid conduit 118 and a hydraulic fluid conduit 119 to the second brake $B_2$ (i.e., 35 in FIG. 1) so as to engage it, and via the hydraulic fluid conduit 118 and a hydraulic fluid conduit 120 this hydraulic fluid pressure is also supplied to a port 121 of the second/third speed switching valve 109. Now, when the vehicle road speed as indicated by the value of the governor hydraulic fluid pressure Ga present in the hydraulic fluid conduit system 112 is not quite high as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 109a of the second/third speed switching valve 109 is controlled, said valve element 109a is shifted by the action of said throttle hydraulic fluid pressure Th which overcomes the action of said governor hydraulic fluid pressure Ga thereon to its downwardly biased position in the sense of FIG. 2 within the bore of said second/third speed switching valve 109. In this operational condition, as schematically indicated by the arrow and stop sign on the schematically shown valve element 109a in FIG. 2, the hydraulic fluid pressure present as explained above at the port 121 of said second/third speed switching valve 109 is intercepted by said valve element 109a, and is not transmitted to any other port of said second/third speed switching valve 109. As explained above, no other hydraulic fluid pressures are present within the system, and accordingly the only friction engaging mechanisms which are supplied with actuating hydraulic fluid pressure are the first clutch $C_1$ (i.e., 23 in FIG. 1)—which is still being supplied with actuating hydraulic fluid pressure via the hydraulic fluid conduit 114 as explained above with respect to provision of the first speed stage—and the second brake $B_2$ (i.e., 35 in FIG. 1). Thus, actuating hydraulic fluid pressures are supplied to the various friction engaging mechanisms of the transmission shown in FIG. 1 as shown by the second line of Table I, and, as will be understood by one of ordinary skill in the transmission art based upon the disclosure herein, the transmission is set to its second speed stage with no engine braking being available. And in this second speed stage both the first gear transmission mechanism 12 and the second gear transmission mechanism 13 are functioning in their underdrive modes, and neither of them functions in its directly connected mode.

THE THIRD SPEED STAGE (IN "D" RANGE)

Now, when the vehicle road speed as indicated by the value of the governor hydraulic fluid pressure Ga present in the hydraulic fluid conduit system 112 is rather higher as compared with the load on the internal combustion engine 1 as indicated by the value of the throttle hydraulic fluid pressure Th present in the hydraulic fluid conduit system 111 than in the previously explained first and second speed cases, then, according to the aforesaid balance relationship between said throttle hydraulic fluid pressure Th and said governor hydraulic fluid pressure Ga according to which the valve element 109a of the second/third speed switching valve 109 is controlled, said valve element 109a is shifted by the action of said governor hydraulic fluid pressure Ga which overcomes the action of said throttle hydraulic fluid pressure Th thereon to its upwardly biased position in the sense of FIG. 2 within the bore of said second/third speed switching valve 109. In this operational condition, as again schematically indicated by the arrow and stop sign on the schematically shown valve element 109a in FIG. 2, the hydraulic fluid pressure present as explained above at the port 121 of said second/third speed switching valve 109 is transmitted past said valve element 109a to the port 122 of said second/third speed switching valve 109. From this port 122, this hydraulic fluid pressure is transmitted via a hydraulic fluid conduit 123 and a hydraulic fluid conduit 124 to the third clutch $C_3$ (i.e., 48 in FIG. 1) so as to engage it, and via the hydraulic fluid conduit 123 and a hydraulic fluid conduit 125 this hydraulic fluid pressure is also supplied to a port 126 of the third/fourth speed switching valve 110. Now, when the vehicle road speed as indicated by the value of the governor hydraulic fluid pressure Ga present in the hydraulic fluid conduit system 112 is not very high as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 110a of the third/fourth speed switching valve 110 is controlled, said valve element 110a is shifted by the action of said throttle hydraulic fluid pressure Th which overcomes the action of said governor hydraulic fluid pressure Ga thereon to its downwardly biased position in the sense of FIG. 2 within the bore of said third/fourth speed switching valve 110. In this operational condition, as schematically indicated by the arrows and stop signs on the schematically shown valve element 110a in FIG. 2, the hydraulic fluid pressure present as explained above at the port 126 of said third/fourth speed switching valve 110 is intercepted by said valve element 110a, and is not transmitted to any other port of said second/third speed switching valve 110. As explained above, no other hydraulic fluid pressures are present within the system, and accordingly the only friction engaging mechanisms which are supplied with actuating hydraulic fluid pressure are the first clutch $C_1$ (i.e., 23 in FIG. 1) and the second brake $B_2$ (i.e. 35 in FIG. 1)—which are still being supplied with actuating hydraulic fluid pressure via the hydraulic fluid conduit 114 and the hydraulic fluid conduit 119 as explained above with respect to provision of the second speed stage—and the third clutch $C_3$ (i.e., 48 in FIG. 1). Thus, actuating hydraulic fluid pressures are supplied to the various friction engaging mechanisms of the transmission shown in FIG. 1 as shown by the third line of Table I, and, as will be understood by one of ordinary skill in the transmission art based upon the disclosure herein, the transmission is set to its third speed stage with again no engine braking being available. Now in this third speed stage the first gear transmission mechanism 12 is functioning in its underdrive mode, while the second gear transmission mechanism 13 is now functioning in its directly connected mode.

THE FOURTH SPEED STAGE (IN "D" RANGE)

Now, when the vehicle road speed as indicated by the value of the governor hydraulic fluid pressure Ga present in the hydraulic fluid conduit system 112 is yet higher as compared with the load on the internal combustion engine 1 as indicated by the value of the throttle hydraulic fluid pressure Th present in the hydraulic fluid conduit system 111 than in the previously explained first, second, and third speed cases, then, according to the aforesaid balance relationship between said throttle hydraulic fluid pressure Th and said governor hydraulic fluid pressure Ga according to which the valve element 110a of the third/fourth speed switching valve 110 is controlled, said valve element 110a is shifted by the action of said governor hydraulic fluid pressure Ga which overcomes the action of said throttle hydraulic fluid pressure Th thereon to its upwardly biased position in the sense of FIG. 2 within the bore of said third/fourth speed switching valve 110. In this operational condition, as again schematically indicated by the arrows and stop signs on the schematically shown valve element 110a in FIG. 2, the hydraulic fluid pressure present as explained above at the port 126 of said third/fourth speed switching valve 110 is transmitted past said valve element 110a to the port 127 of said third/fourth speed switching valve 110. From this port 127, this hydraulic fluid pressure is transmitted via a hydraulic fluid conduit 128 to the second clutch $C_2$ (i.e., 24 in FIG. 1) so as to engage it. As explained above, no other hydraulic fluid pressures are present within the system, and accordingly, the only friction engaging mechanisms which are supplied with actuating hydraulic fluid pressure are the first clutch $C_1$ (i.e., 23 in FIG. 1), the second brake $B_2$ (i.e. 35 in FIG. 1), and the third clutch $C_3$ (i.e., 48 in FIG. 1)—which are still being supplied with actuating hydraulic fluid pressure via the hydraulic fluid conduits 114, 119, and 124 as explained above with respect to provision of the second speed stage—and the second clutch $C_2$ (i.e., 24 in FIG. 1). Thus, actuating hydraulic fluid pressures are supplied to the various friction engaging mechanisms of the transmission shown in FIG. 1 as shown by the fourth line of Table I, and, as will be understood by one of ordinary skill in the transmission art based upon the disclosure herein, the transmission is set to its fourth speed stage with in this case engine braking being available. Now in this fourth speed stage the first gear transmission mechanism 12 is functioning in its underdrive mode, and also the second gear transmission mechanism 13 is now functioning in its underdrive mode. Accordingly, the gearing ratio provided by the transmission as a whole is simply the ratio between the numbers of teeth on the gear wheels 53 and 54, and in the case of the shown preferred embodiment of the transmission according to the present invention, as can be seen from FIG. 1, this is an overdrive gearing ratio, since the number of teeth on the gear wheel 54 is less than the number of teeth on the gear wheel 53.

OPERATION IN "3" OR THIRD RANGE

When the manual transmission range selection valve 107 is positioned by the hand of the driver of the vehicle to "3" or third range, which is done when it is desired to drive the vehicle forwards in an operational mode which provides a moderate amount of engine braking at a somewhat lower speed than in normal driving, then, as indicated in Table II, supply of the aforesaid pressure $P_1$ therefrom to the hydraulic fluid conduit 113, and of the aforesaid pressure $P_2$ (equal in magnitude to the line hydraulic fluid pressure) to the hydraulic fluid conduit 129, is made available, and the pressures $P_3$, $P_4$, and $P_5$ are not made available. In this case, therefore, since the pressure $P_2$ is now present in the hydraulic fluid conduit 129, supply of line hydraulic fluid pressure is made via the hydraulic fluid conduit 130 to the overriding pressure chamber (not particularly shown) at the upper end of the third/fourth speed switching valve 110 in the figure, i.e. at the end of the valve element 110a of said third/fourth speed switching valve 110 to which the throttle hydraulic fluid pressure Th is supplied, and thus the relevant balance relationship between the throttle hydraulic fluid pressure Th and the governor hydraulic fluid pressure Ga on the valve element 110a of that speed switching valve is not allowed to control it, but instead the valve element 110a of that speed switching valve is forcibly moved to its downwardly biased position as seen in the figure. Accordingly, since the port 126 of the third/fourth switching valve 110 is thereby definitely cut off from communication with the port 127 thereof, definitely no hydraulic fluid pressure is supplied via the hydraulic fluid conduit 128 to the second clutch $C_2$ (i.e. 24 in FIG. 1) so as to engage it, and accordingly the fourth speed stage of the automatic transmission, in which the first gear transmission mechanism 12 is providing its directly connected speed stage, is definitely never made available, no matter what may be the values of the throttle hydraulic fluid pressure Th and the governor hydraulic fluid pressure Ga. Further, this hydraulic fluid pressure $P_2$ of magnitude equal to the line hydraulic fluid pressure present in the hydraulic fluid conduit 129 is also supplied via the hydraulic fluid conduit 131 to the port 132 of the first/second speed switching valve 108, for a purpose which will be explained hereinafter. However, as before, since the pressure $P_3$ is not present in the hydraulic fluid conduit 135, no hydraulic fluid pressure is supplied via the hydraulic fluid conduit 138 to the overriding pressure chamber (not particularly shown) at the upper end of the second/third speed switching valve 109 in the figure, i.e. at the end of the valve element 109a of said second/third speed switching valve 109 to which the throttle hydraulic fluid pressure Th is supplied, and thus the relevant balance relationship between the throttle hydraulic fluid pressure Th and the governor hydraulic fluid pressure Ga on the valve element 109a of that speed switching valve is allowed to control it. Also, since the hydraulic fluid pressure $P_3$ is not being supplied by the manual range selection valve 107 when this "3" or third range is selected, no hydraulic fluid pressure is supplied through the hydraulic fluid conduit 135 to be supplied to the shuttle valve 136 to actuate the fourth brake $B_4$ (i.e., 49 in FIG. 1) so as to engage it via the hydraulic fluid conduit 137. Further, since the pressure $P_4$ is not present in the hydraulic fluid conduit 139, no hydraulic fluid pressure is supplied via the hydraulic fluid conduit 140 to the overriding pressure chamber (not particularly shown) at the upper end of the first-/second speed switching valve 108 in the figure, i.e. at the end of the valve element 108a of said first/second speed switching valve 108 to which the throttle hydraulic fluid pressure Th is supplied, and thus the relevant balance relationship between the throttle hydraulic fluid pressure Th and the governor hydraulic fluid pressure Ga on the valve element 108a of that speed switching valve is allowed to control it.

THE FIRST SPEED STAGE (IN "3" RANGE)

Now, when the vehicle road speed as indicated by the value of the governor hydraulic fluid pressure Ga present in the hydraulic fluid conduit system 112 is low as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said throttle hydraulic fluid pressure Th which overcomes the action of said governor hydraulic fluid pressure Ga thereon to its downwardly biased position in the sense of FIG. 2 within the bore of said first/second speed switching valve 108. In this operational condition, as schematically indicated by the arrows and stop signs on the schematically shown valve element 108a in FIG. 2, the hydraulic fluid pressure present as explained above at the port 116 of said first/second speed switching valve 108 is intercepted by said valve element 108a, and is not transmitted to any other port of said first-/second speed switching valve 108. Further, the hydraulic fluid pressure present as explained above at the port 132 of said first/second speed switching valve 108 is intercepted by said valve element 108a, and is not transmitted to any other port of said first/second speed switching valve 108. As explained above, no other hydraulic fluid pressures are present within the system, and accordingly the only friction engaging mechanism which is supplied with actuating hydraulic fluid pressure is the first clutch $C_1$ (i.e., 23 in FIG. 1) so as to engage it. Thus, actuating hydraulic fluid pressures are supplied to the various friction engaging mechanisms of the transmission shown in FIG. 1 as shown by the fifth line of Table I, and, as will be understood by one of ordinary skill in the transmission art based upon the disclosure herein, the transmission is set to its first speed stage with no engine braking being available. And again in this first speed stage both the first gear transmission mechanism 12 and the second gear transmission mechanism 13 are functioning in their underdrive modes, and neither of them functions in its directly connected mode.

THE SECOND SPEED STAGE (IN "3" RANGE)

Now, when the vehicle road speed as indicated by the value of the governor hydraulic fluid pressure Ga present in the hydraulic fluid conduit system 112 is somewhat higher as compared with the load on the internal combustion engine 1 as indicated by the value of the throttle hydraulic fluid pressure Th present in the hydraulic fluid conduit system 111 than in the just previously explained first speed case, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said governor hydraulic fluid pressure Ga which overcomes the action of said throttle hydraulic fluid pressure Th thereon to its upwardly biased position in the sense of FIG. 2 within the bore of said first-/second speed switching valve 108. In this operational condition, as again schematically indicated by the arrows and stop signs on the schematically shown valve element 108a in FIG. 2, the hydraulic fluid pressure present as explained above at the port 116 of said first-/second speed switching valve 108 is transmitted past said valve element 108a to the port 117 of said first-/second speed switching valve 108. Further, the hydraulic fluid pressure present as explained above at the port 132 of said first/second speed switching valve 108 is transmitted past said valve element 108a to the port 133 of said first/second speed switching valve 108. From this port 133, this hydraulic fluid pressure is transmitted via a hydraulic fluid conduit 134 to the first brake $B_1$ (i.e., 25 in FIG. 1) so as to engage it. Further, from the port 117, the hydraulic fluid pressure present there is transmitted via the hydraulic fluid conduit 118 and the hydraulic fluid conduit 119 to the second brake $B_2$ (i.e., 35 in FIG. 1) so as to engage it, and via the hydraulic fluid conduit 118 and the hydraulic fluid conduit 120 this hydraulic fluid pressure is also supplied to the port 121 of the second/third speed switching valve 109. Now, when the vehicle road speed as indicated by the value of the governor hydraulic fluid pressure Ga present in the hydraulic fluid conduit system 112 is not quite high as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 109a of the second/third speed switching valve 109 is controlled, said valve element 109a is shifted by the action of said throttle hydraulic fluid pressure Th which overcomes the action of said governor hydraulic fluid pressure Ga thereon to its downwardly biased position in the sense of FIG. 2 within the bore of said second/-third speed switching valve 109. In this operational condition, as schematically indicated by the arrow and stop sign on the schematically shown valve element 109a in FIG. 2, the hydraulic fluid pressure present as explained above at the port 121 of said second/third speed switching valve 109 is intercepted by said valve element 109a, and is not transmitted to any other port of said second/third speed switching valve 109. As explained above, no other hydraulic fluid pressures are present within the system, and accordingly the only friction engaging mechanisms which are supplied with actuating hydraulic fluid pressure are the first clutch $C_1$ (i.e., 23 in FIG. 1)—which is still being supplied with actuating hydraulic fluid pressure via the hydraulic fluid conduit 114 as explained above with respect to provision of the first speed stage—the first brake $B_1$ (i.e., 25 in FIG. 1), and the second brake $B_2$ (i.e., 35 in FIG. 1). Thus, actuating hydraulic fluid pressures are supplied to the various friction engaging mechanisms of the transmission shown in FIG. 1 as shown by the sixth line of Table I, and, as will be understood by one of ordinary skill in the transmission art based upon the disclosure herein, the transmission is set to its second speed stage with no engine braking being available, since, although the first gear transmission mechanism 12 now can transmit engine braking torque, still the second gear transmission mechanism 13 can only operate via the operation of the third one way brake $F_3$ (i.e., 46 in FIG. 1). And in this second speed stage both the first gear transmission mechanism 12 and the second gear transmission mechanism 13 are functioning in their underdrive modes, and neither of them functions in its directly connected mode.

THE THIRD SPEED STAGE (IN "3" RANGE)

Now, when the vehicle road speed as indicated by the value of the governor hydraulic fluid pressure Ga present in the hydraulic fluid conduit system 112 is rather higher as compared with the load on the internal combustion engine 1 as indicated by the value of the throttle hydraulic fluid pressure Th present in the hydraulic fluid conduit system 111 than in the previously explained first and second speed cases, then, according to the aforesaid balance relationship between said throttle hydraulic fluid pressure Th and said governor hydraulic fluid pressure Ga according to which the valve element 109a of the second/third speed switching valve 109 is controlled, said valve element 109a is shifted by the action of said governor hydraulic fluid pressure Ga which overcomes the action of said throttle hydraulic fluid pressure Th thereon to its upwardly biased position in the sense of FIG. 2 within the bore of said second/third speed switching valve 109. In this operational condition, as again schematically indicated by the arrow and stop sign on the schematically shown valve element 109a in FIG. 2, the hydraulic fluid pressure present as explained above at the port 121 of said second/third speed switching valve 109 is transmitted past said valve element 109a to the port 122 of said second/third speed switching valve 109. From this port 122, this hydraulic fluid pressure is transmitted via the hydraulic fluid conduit 123 and the hydraulic fluid conduit 124 to the third clutch $C_3$ (i.e., 48 in FIG. 1) so as to engage it, and via the hydraulic fluid conduit 123 and the hydraulic fluid conduit 125 this hydraulic fluid pressure is also supplied to the port 126 of the third/fourth speed switching valve 110. Now, since as explained above by the overriding action of the hydraulic fluid pressure P2 output by the manual transmission range selection valve 107 and supplied to the overriding chamber (not particularly shown in the figure) at the upper end from the point of view of the figure of the third/fourth speed switching valve 110 the valve element 110a of said third/fourth speed switching valve 110 is positively overridingly shifted to its downwardly biased position in the sense of FIG. 2 within the bore of said third/fourth speed switching valve 110, thereby, as schematically indicated by the arrows and stop signs on the schematically shown valve element 110a in FIG. 2, the hydraulic fluid pressure present as explained above at the port 126 of said third/fourth speed switching valve 110 is intercepted by said valve element 110a, and is not transmitted to any other port of said second/third speed switching valve 110. As explained above, no other hydraulic fluid pressures are present within the system, and accordingly the only friction engaging mechanisms which are supplied with actuating hydraulic fluid pressure are the first clutch $C_1$ (i.e., 23 in FIG. 1), the first brake $B_1$ (i.e., 25 in FIG. 1), and the second brake $B_2$ (i.e. 35 in FIG. 1)—which are still being supplied with actuating hydraulic fluid pressure via the hydraulic fluid conduit 114, the hydraulic fluid conduit 134, and the hydraulic fluid conduit 119 as explained above with respect to provision of the second speed stage—and the third clutch $C_3$ (i.e., 48 in FIG. 1). Thus, actuating hydraulic fluid pressures are supplied to the various friction engaging mechanisms of the transmission shown in FIG. 1 as shown by the seventh line of Table I, and, as will be understood by one of ordinary skill in the transmission art based upon the disclosure herein, the transmission is set to its third speed stage with in this case engine braking being available. Now in this third speed stage the first gear transmission mechanism 12 is functioning in its underdrive mode, while the second gear transmission mechanism 13 is now functioning in its directly connected mode.

OPERATION IN "2" OR SECOND RANGE

When the manual transmission range selection valve 107 is positioned by the hand of the driver of the vehicle to "2" or second range, which is done when it is desired to drive the vehicle forwards in an operational mode which provides a more positive amount of engine braking at a lower speed than in driving in "3" range, then, as indicated in Table II, supply of the aforesaid pressure $P_1$ therefrom to the hydraulic fluid conduit 113, of the aforesaid pressure $P_2$ to the hydraulic fluid conduit 129, and of the aforesaid pressure $P_3$ (equal in magnitude to the line hydraulic fluid pressure) to the hydraulic fluid conduit 135, is made available, and the pressures $P_4$ and $P_5$ are not made available. In this case, therefore, since the pressure $P_2$ is now present in the hydraulic fluid conduit 129, supply of line hydraulic fluid pressure is made via the hydraulic fluid conduit 130 to the overriding pressure chamber (not particularly shown) at the upper end of the third/fourth speed switching valve 110 in the figure, i.e. at the end of the valve element 110a of said third/fourth speed switching valve 110 to which the throttle hydraulic fluid pressure Th is supplied, and thus the relevant balance relationship between the throttle hydraulic fluid pressure Th and the governor hydraulic fluid pressure Ga on the valve element 110a of that speed switching valve is not allowed to control it, but instead the valve element 110a of that speed switching valve is forcibly moved to its downwardly biased position as seen in the figure. Further, since the pressure $P_3$ is now present in the hydraulic fluid conduit 135, supply of line hydraulic fluid pressure is made via the hydraulic fluid conduit 138 to the overriding pressure chamber (not particularly shown) at the upper end of the second/third speed switching valve 109 in the figure, i.e. at the end of the valve element 109a of said second/third speed switching valve 109 to which the throttle hydraulic fluid pressure Th is supplied, and thus the relevant balance relationship between the throttle hydraulic fluid pressure Th and the governor hydraulic fluid pressure Ga on the valve element 109a of that speed switching valve is not allowed to control it, but instead the valve element 109a of that speed switching valve is forcibly moved to its downwardly biased position as seen in the figure. This pressure P₃ present in the hydraulic fluid conduit 135 is also supplied via the shuttle valve 136 and the hydraulic fluid conduit 137 to the fourth brake B₄ (i.e., 49 in FIG. 1) so as to engage it. However, as before, since the pressure P₄ is not present in the hydraulic fluid conduit 139, no hydraulic fluid pressure is supplied via the hydraulic fluid conduit 140 to the overriding pressure chamber (not particularly shown) at the upper end of the first/second speed switching valve 108 in the figure, i.e. at the end of the valve element 108a of said first/second speed switching valve 108 to which the throttle hydraulic fluid pressure Th is supplied, and thus the relevant balance relationship between the throttle hydraulic fluid pressure Th and the governor hydraulic fluid pressure Ga on the valve element 108a of that speed switching valve is allowed to control it.

THE FIRST SPEED STAGE (IN "2" RANGE)

Now, when the vehicle road speed as indicated by the value of the governor hydraulic fluid pressure Ga present in the hydraulic fluid conduit system 112 is low as compared with the load on the internal combustion engine 1 as indicated by the value of the throttle hydraulic fluid pressure Th present in the hydraulic fluid conduit system 111, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said throttle hydraulic fluid pressure Th which overcomes the action of said governor hydraulic fluid pressure Ga thereon to its downwardly biased position in the sense of FIG. 2 within the bore of said first/second speed switching valve 108. In this operational condition, as schematically indicated by the arrows and stop signs on the schematically shown valve element 108a in FIG. 2, the hydraulic fluid pressure present as explained above at the port 116 of said first/second speed switching valve 108 is intercepted by said valve element 108a, and is not transmitted to any other port of said first/second speed switching valve 108. Further, the hydraulic fluid pressure present as explained above at the port 132 of said first/second speed switching valve 108 is intercepted by said valve element 108a, and is not transmitted to any other port of said first/second speed switching valve 108. As explained above, no other hydraulic fluid pressures are present within the system, and accordingly the only friction engaging mechanisms which are supplied with actuating hydraulic fluid pressure so as to engage them are the first clutch C₁ (i.e., 23 in FIG. 1) and, as explained above, the fourth brake B₄ (i.e., 49 in FIG. 1). Thus, actuating hydraulic fluid pressures are supplied to the various friction engaging mechanisms of the transmission shown in FIG. 1 as shown by the eighth line of TAble I, and, as will be understood by one of ordinary skill in the transmission art based upon the disclosure herein, the transmission is set to its first speed stage with no engine braking being available, since, although the second gear transmission mechanism 13 now can transmit engine braking torque, still the first gear transmission mechanism 12 can only operate via the operation of the second one way brake F₂ (i.e., 36 in FIG. 1). And again in this first speed stage both the first gear transmission mechanism 12 and the second gear transmission mechanism 13 are functioning in their underdrive modes, and neither of them functions in its directly connected mode.

THE SECOND SPEED STAGE (IN "2" RANGE)

Now, when the vehicle road speed as indicated by the value of the governor hydraulic fluid pressure Ga present in the hydraulic fluid conduit system 112 is somewhat higher as compared with the load on the internal combustion engine 1 as indicated by the value of the throttle hydraulic fluid pressure Th present in the hydraulic fluid conduit system 111 than in the just previously explained first speed case, then, according to the aforesaid balance relationship between said throttle hydraulic fluid pressure Th and said governor hydraulic fluid pressure Ga according to which the valve element 108a of the first/second speed switching valve 108 is controlled, said valve element 108a is shifted by the action of said governor hydraulic fluid pressure Ga which overcomes the action of said throttle hydraulic fluid pressure Th thereon to its upwardly biased position in the sense of FIG. 2 within the bore of said first/second speed switching valve 108. In this operational condition, as again schematically indicated by the arrows and stop signs on the schematically shown valve element 108a in FIG. 2, the hydraulic fluid pressure present as explained above at the port 116 of said first/second speed switching valve 108 is transmitted past said valve element 108a to the port 117 of said first/second speed switching valve 108. Further, the hydraulic fluid pressure present as explained above at the port 132 of said first/second speed switching valve 108 is transmitted past said valve element 108a to the port 133 of said first/second speed switching valve 108. From this port 133, this hydraulic fluid pressure is transmitted via a hydraulic fluid conduit 134 to the first brake B₁ (i.e., 25 in FIG. 1) so as to engage it. Further, from the port 117, the hydraulic fluid pressure present there is transmitted via the hydraulic fluid conduit 118 and the hydraulic fluid conduit 119 to the second brake B₂ (i.e., 35 in FIG. 1) so as to engage it, and via the hydraulic fluid conduit 118 and the hydraulic fluid conduit 120 this hydraulic fluid pressure is also supplied to the port 121 of the second/third speed switching valve 109. However, since the overriding pressure P₃ is now as explained above present in the hydraulic fluid conduit 135 and the hydraulic fluid conduit 138 and is being supplied to the overriding chamber at the top from the point of view of the figure of the second/third speed switching valve 109, thus, irrespective of the aforesaid balance relationship between said throttle hydraulic fluid pressure Th and said governor hydraulic fluid pressure Ga according to which the valve element 109a of the second/third speed switching valve 109 is controlled, said valve element 109a is positively overridingly shifted by the action of said overriding hydraulic fluid pressure thereon to its downwardly biased position in the sense of FIG. 2 within the bore of said second/third speed switching valve 109. In this operational condition, as schematically indicated by the arrow and stop sign on the schematically shown valve element 109a in FIG. 2, the hydraulic fluid pressure present as explained above at the port 121 of said second/third speed switching valve 109 is intercepted by said valve element 109a, and is not transmitted to any other port of said second/third speed switching valve 109. As explained above, no other hydraulic fluid pressures are present within the system, and accordingly the only friction engaging mechanisms which are supplied with actuating hydraulic fluid pressure are the first clutch $C_1$ (i.e., 23 in FIG. 1) and the fourth brake $B_4$ (i.e., 49 in FIG. 1)—which are still being supplied with actuating hydraulic fluid pressure via the hydraulic fluid conduit 114 and the hydraulic fluid conduit 137 respectively as explained above with respect to provision of the first speed stage—the first brake $B_1$ (i.e., 25 in FIG. 1), and the second brake $B_2$ (i.e., 35 in FIG. 1). Thus, actuating hydraulic fluid pressures are supplied to the various friction engaging mechanisms of the transmission shown in FIG. 1 as shown by the ninth line of Table I, and, as will be understood by one of ordinary skill in the transmission art based upon the disclosure herein, the transmission is set to its second speed stage with in this case engine braking being available. And in this second speed stage both the first gear transmission mechanism 12 and the second gear transmission mechanism 13 are functioning in their underdrive modes, and neither of them functions in its directly connected mode.

OPERATION IN "L" OR LOW RANGE (FIRST SPEED ONLY)

When the manual transmission range selection valve 107 is positioned by the hand of the driver of the vehicle to "L" or low range, which is done when it is desired to drive the vehicle forwards in an operational mode which provides a large amount of engine braking at a very low speed, then, as indicated in Table II, supply of the aforesaid pressure $P_1$ therefrom to the hydraulic fluid conduit 113, of the aforesaid pressure $P_2$ to the hydraulic fluid conduit 129, of the aforesaid pressure $P_3$ to the hydraulic fluid conduit 135, and of the aforesaid pressure $P_4$ (equal in magnitude to the line hydraulic fluid pressure) to the hydraulic fluid conduit 139, is made available, and only the pressure $P_5$ is not made available. In this case, therefore, since the pressure $P_2$ is now present in the hydraulic fluid conduit 129, supply of line hydraulic fluid pressure is made via the hydraulic fluid conduit 130 to the overriding pressure chamber (not particularly shown) at the upper end of the third-/fourth speed switching valve 110 in the figure, i.e. at the end of the valve element 110a of said third/fourth speed switching valve 110 to which the throttle hydraulic fluid pressure Th is supplied, and thus the relevant balance relationship between the throttle hydraulic fluid pressure Th and the governor hydraulic fluid pressure Ga on the valve element 110a of that speed switching valve is not allowed to control it, but instead the valve element 110a of that speed switching valve is forcibly moved to its downwardly biased position as seen in the figure. Further, since the pressure $P_3$ is now present in the hydraulic fluid conduit 135, supply of line hydraulic fluid pressure is made via the hydraulic fluid conduit 138 to the overriding pressure chamber (not particularly shown) at the upper end of the second-/third speed switching valve 109 in the figure, i.e. at the end of the valve element 109a of said second/third speed switching valve 109 to which the throttle hydraulic fluid pressure Th is supplied, and thus the relevant balance relationship between the throttle hydraulic fluid pressure Th and the governor hydraulic fluid pressure Ga on the valve element 109a of that speed switching valve is not allowed to control it, but instead the valve element 109a of that speed switching valve is forcibly moved to its downwardly biased position as seen in the figure. This pressure $P_3$ present in the hydraulic fluid conduit 135 is also supplied via the shuttle valve 136 and the hydraulic fluid conduit 137 to the fourth brake $B_4$ (i.e., 49 in FIG. 1) so as to engage it. Yet further, since the pressure $P_4$ is now present in the hydraulic fluid conduit 139, supply of line hydraulic fluid pressure is made via the hydraulic fluid conduit 140 to the overriding pressure chamber (not particularly shown) at the upper end of the first/second speed switching valve 108 in the figure, i.e. at the end of the valve element 108a of said first/second speed switching valve 108 to which the throttle hydraulic fluid pressure Th is supplied, and thus the relevant balance relationship between the throttle hydraulic fluid pressure Th and the governor hydraulic fluid pressure Ga on the valve element 108a of that speed switching valve is not allowed to control it, but instead the valve element 108a of that speed switching valve is forcibly moved to its downwardly biased position as seen in the figure. This hydraulic fluid pressure $P_4$ is also supplied to a port 142 of the first/second speed switching valve 108, via a hydraulic fluid conduit 141.

Now, irrespective of the value of the vehicle road speed as indicated by the value of the governor hydraulic fluid pressure Ga present in the hydraulic fluid conduit system 112, and irrespective of the aforesaid balance relationship between said throttle hydraulic fluid pressure Th and said governor hydraulic fluid pressure Ga according to which the valve element 108a of the first/second speed switching valve 108 is controlled, said valve element 108a is overridingly shifted by the action of the overriding hydraulic fluid pressure $P_4$ which is supplied to the overriding chamber (not particularly shown) provided at the upper end as seen in the figure of the first/second switching valve 108 to its downwardly biased position in the sense of FIG. 2 within the bore of said first/second speed switching valve 108. Thus the transmission is fixedly held in its first speed stage operational condition. In this operational condition, as schematically indicated by the arrows and stop signs on the schematically shown valve element 108a in FIG. 2, the hydraulic fluid pressure present as explained above at the port 116 of said first-/second speed switching valve 108 is intercepted by said valve element 108a, and is not transmitted to any other port of said first/second speed switching valve 108. Further, the hydraulic fluid pressure present as explained above at the port 132 of said first/second speed switching valve 108 is intercepted by said valve element 108a, and is not transmitted to any other port of said first/second speed switching valve 108. However, now as mentioned above the hydraulic fluid pressure $P_4$ is also being supplied to the port 142 of the first/second speed switching valve 108, via the hydraulic fluid conduit 141, and from this port 142 the hydraulic fluid pressure is supplied to another port 143 of the first-/second speed switching valve whence via a hydraulic fluid conduit 144 and a shuttle valve 145 said hydraulic fluid pressure is supplied via a hydraulic fluid conduit 146 to the third brake $B_3$ (i.e., 37 in FIG. 1), so as to engage it. As explained above, no other hydraulic fluid pressures are present within the system, and accordingly the only friction engaging mechanisms which are supplied with actuating hydraulic fluid pressure so as to engage them are the first clutch $C_1$ (i.e., 23 in FIG. 1), which is being supplied with the hydraulic fluid pressure $P_1$ present in the hydraulic fluid conduit 113, as explained above, the fourth brake $B_4$ (i.e., 49 in FIG. 1), which is being supplied with the hydraulic fluid pressure $P_3$ present in the hydraulic fluid conduit 135, via the shuttle valve 136, as explained above, and the third brake $B_3$ (i.e., 37 in FIG. 1). Thus, actuating hydraulic fluid pressures are supplied to the various friction engaging mechanisms of the transmission shown in FIG. 1 as shown by the tenth line of Table I, and, as will be understood by one of ordinary skill in the transmission art based upon the disclosure herein, the transmission is set to its first speed stage with in this case engine braking being available. And again in this first speed stage both the first gear transmission mechanism 12 and the second gear transmission mechanism 13 are functioning in their underdrive modes, and neither of them functions in its directly connected mode.

OPERATION IN "R" OR REVERSE RANGE

When the manual transmission range selection valve 107 is positioned by the hand of the driver of the vehicle to "R" or reverse driving range, which is done when it is desired to drive the vehicle in a backwards direction, then, as indicated in Table II, supply of the pressure $P_5$ (equal in magnitude to the line hydraulic fluid pressure) therefrom to the hydraulic fluid conduit 147, only, is made available, and the pressures $P_1$, $P_2$, $P_3$, and $P_4$ are not made available. In this case, therefore, the hydraulic fluid pressure $P_5$ is supplied via a hydraulic fluid conduit 147 to a port 148 of the third/fourth speed switching valve 110. Now, as may be seen from the arrow in FIG. 2 on the valve element 110a of the third/fourth speed switching valve 110 schematically shown in that figure, provided that the valve element 110a is in its downwardly displaced position within the bore of this speed switching valve as seen from the point of view of the figure which obviously will be the case at the low road speeds at which it will be contemplated to utilize reverse speed stage vehicle operation, this hydraulic fluid pressure $P_5$ is supplied from the port 148 to another port 149 of the third/fourth speed switching valve 110, and thence is supplied via a hydraulic fluid conduit 150 to a branch point, where said hydraulic fluid pressure is supplied to two conduits: a hydraulic fluid conduit 151 and a hydraulic fluid conduit 153.

From the hydraulic fluid conduit 153, this pressure is supplied to another branch point, whence it is supplied via a hydraulic fluid conduit 154 and the aforementioned shuttle valve 136 and the other hydraulic fluid conduit 137 to the fourth brake $B_4$ (i.e., 49 in FIG. 1) so as to engage it. Further, from this branch point the hydraulic fluid pressure $P_5$ is also supplied via a hydraulic fluid conduit 155 and the aforementioned shuttle valve 145 and the other hydraulic fluid conduit 146 to the third brake $B_3$ (i.e., 37 in FIG. 1) so as to engage it. On the other hand, from the hydraulic fluid conduit 151, the hydraulic fluid pressure $P_5$ is led via a port 152 of the third/fourth speed switching valve 110 which is at this time, since the valve element 110a of the third/fourth speed switching valve 110 is in its downwardly displaced position within the bore of this speed switching valve as seen from the point of view of the figure, communicated with the port 127 as shown from the arrow in FIG. 2 on the valve element 110a of the third/fourth speed switching valve 110 schematically shown in that figure, and from this port 127 this hydraulic fluid pressure $P_5$ is conducted via the hydraulic fluid conduit 128 to the second clutch $C_2$ (i.e., 24 in FIG. 1) so as to engage it. As explained above, no other hydraulic fluid pressures are present within the system, and accordingly the only friction engaging mechanisms which are supplied with actuating hydraulic fluid pressure so as to engage them are the second clutch $C_2$ (i.e., 24 in FIG. 1), which is being supplied with the hydraulic fluid pressure $P_1$ present in the hydraulic fluid conduit 128, as explained above, the fourth brake $B_4$ (i.e., 49 in FIG. 1), which is being supplied with the hydraulic fluid pressure $P_5$ present in the hydraulic fluid conduit 154, via the shuttle valve 136, as explained above, and the third brake $B_3$ (i.e., 37 in FIG. 1). Thus, actuating hydraulic fluid pressures are supplied to the various friction engaging mechanisms of the transmission shown in FIG. 1 as shown by the eleventh and last line of Table I, and, as will be understood by one of ordinary skill in the transmission art based upon the disclosure herein, the transmission is set to its reverse speed stage. And again in this reverse speed stage both the first gear transmission mechanism 12 and the second gear transmission mechanism 13 are functioning in their underdrive modes, and neither of them functions in its directly connected mode.

Now, in the shown preferred embodiment of the transmission according to the present invention, by suitable choosing of the numbers of gear cogs on the various gear wheels, it is possible to so arrange matters that the first gear transmission mechanism 12 is capable of providing four different rotational speed reduction ratios, as follows: a lowest reduction ratio, equal to 2.811 (i.e., in which the rotational power output shaft of said first gear transmission mechanism 12, the shaft 40, rotates 1/2.811 times as fast as does the rotational power input shaft of said first gear transmission mechanism 12, the shaft 14); an intermediate reduction ratio, equal to 1.549; a highest reduction ratio, equal to 1.000 in this case of course the first gear transmission mechanism 12 is in its directly connected state); and a reverse reduction ratio, equal to 2.296. Further, it is possible to so arrange matters that the second gear transmission mechanism 13 is capable of providing two different rotational speed reduction ratios, as follows: a lower reduction ratio, equal to 1.441 (i.e., in which the rotational power output shaft of said gear transmission mechanism 12, the lay shaft 71, rotates 1/2.811 times as fast as does the rotational power input shaft of said first gear transmission mechanism 12, the hollow shaft 70), and a highest reduction ratio, equal to 1.000 (in this case of course the second gear transmission mechanism 13 is in its directly connected state). In this case, provided that also the ratio between the nunber of teeth on the gear wheel 54 and the number of teeth on the gear wheel 53 is 0.7, which is convenient, as explained above, for making the gear wheel 54 compact and for reducing the bulge in the casing of the automatic transmission assembly which is required to be provided for housing said gear wheel 54, then the following total rotational reduction ratios are available for the transmission as a whole, from the rotational power input member for said transmission, i.e. the first shaft 14, to the rotational power output member for said transmission, i.e. the lay shaft 71, are as follows in each of the speed stages of the transmission: for the first speed stage, in which the first gear transmission mechanism 12 is providing its lowest reduction ratio and the second gear transmission mechanism 13 is providing its lower reduction ratio, 2.835; for the second speed stage, in which the first gear transmission mechanism 12 is providing its intermediate reduction ratio and the second gear transmission mechanism 13 is providing its lower reduction ratio, 1.562; for the third speed stage, in which the first gear transmission mechanism 12 is providing its intermediate reduction ratio and the second gear transmission mechanism 13 is providing its higher reduction ratio, 1.084; for the fourth speed stage, in which the first gear transmission mechanism 12 is providing its highest reduction ratio and the second gear transmission mechanism 13 is providing its higher reduction ratio, 0.700; and for the reverse speed stage, in which the first gear transmission mechanism 12 is providing its reverse reduction ratio and the second gear transmission mechanism 13 is providing its lower reduction ratio, 2.315. These reduction ratios provided by the first gear transmission mechanism 12 and the second gear transmission mechanism 13, and the total reduction ratios of the transmission as a whole, for each of the speed stages, are summarized in Table III, which is located at the end of this specification and is to be understood as included therein.

Advantages of constructing the automatic transmission according to the present invention in the manner shown, among others, are that, by incorporating both the first gear transmission mechanism 12 and the second gear transmission mechanism 13, the first gear transmission mechanism 12 being provided as lying along the first axis which lies along the upper part of FIG. 1, while the second gear transmission mechanism 13 is provided as lying along the second axis which lies along the lower part of FIG. 1 and is parallel with and displaced from the first axis, the overall construction of the automatic transmission is rendered remarkably compact, and its axial length is very greatly reduced as compared with conventional designs of the sort outlined in this specification. Further, the transmission is easy and cheap to manufacture, and easy to assemble and to service after assembly. Because the lay shaft 71 passes through the second gear transmission mechanism 13, its bearing structure (comprising the bearing devices 73 and 74) is as a matter of course rendered much simpler than would be the case if said lay shaft 71 only extended from one side of said second gear transmission mechanism 13. The increased rigidity of the support of the lay shaft 71 also means that the transmission is strong and durable during use; and, as a matter of course, reduces the gear noise that is caused by the operation of the transmission, thus rendering the transmission more environmentally acceptable, and increasing the drivability of the automotive vehicle to which said transmission is fitted.

By the first gear transmission mechanism 12 and the second gear transmission mechanism 13 both being constructed as underdrive mechanisms, each being selectively controllable to produce any one of a plurality of speed ratios between its power input member and its power output member all of which are speed reducing ratios except one which is a directly connected speed ratio equal to unity, thus the highest speed stage of the transmission as a whole is obtained both by engaging the first gear transmission mechanism 12 to its directly connected speed ratio and by engaging the second gear transmission mechanism 13 to its directly connected speed ratio. Since the highest speed stage of the automatic transmission is the speed stage which typically will be used for the highest proportion of the operating time of the transmission, and since the directly connected speed ratio of a gear transmission mechanism is typically the speed ratio thereof during the provision of which the gear transmission mechanism is worn to the least extent and makes the least amount of noise, the feature described above implies that the automatic transmission according to the present invention is quiet and reliable.

Now, because the number of teeth on the second gear wheel 54 is less than the number of teeth on the first gear wheel 53, therefore the aforesaid highest speed stage of the transmission as a whole will be an overdrive speed stage, in which the power output gear wheel 57 rotates more quickly than does the rotational power input member of the first gear transmission mechanism (i.e., the shaft 14). Further, according to this feature, the second gear wheel 54 will be smaller than the first gear wheel 53, and accordingly the bulge (not particularly shown) which is required as a matter of course to be provided as formed in the transmission housing 26 to house said second gear wheel 54 is smaller than would otherwise be the case. This means that the transmission as a whole is made more compact; and also when the second axis is provided as lying generally under the first axis as typically will be the case, then particularly the bulge on the lower part of the transmission due to the provision of space for housing said second gear wheel 54 is reduced. This means that the danger of interference between this bulge and the drive shaft (also not particularly shown) which drives the wheel on that side of the longitudinal axis of the vehicle is reduced or eliminated, which is very helpful from the design and assembly points of view, as well as simplifying the servicing of the automotive vehicle after assembly.

With the hydraulic fluid pressure control system shown in FIG. 2 being used to control the transmission according to the present invention, it will be understood from the explanations above that the control system can control the first gear transmission mechanism 12 and the second gear transmission mechanism 13 to provide their various speed ratios, and by suitable combinations of these speed ratios being provided together various suitable speed ratios for the speed stages of the transmission as a whole can be concocted. Further, as mentioned above, the aforesaid highest speed stage of the transmission as a whole will be an overdrive speed stage, in which the power output gear wheel 57 rotates more quickly than does the rotational power input member of the first gear transmission mechanism (the shaft 14), and the ratio of the rotational speeds of these members will be given by the ratio of the number of the teeth on the first gear wheel 53 to the number of teeth on the second gear wheel 54.

Finally, according to the particular construction which has been explained for the transmission according to the preferred embodiment of the present invention and for the hydraulic fluid pressure control system therefor, engine braking is made available in the more desirable case in each transmission range, i.e. in the highest speed stage which can be engaged in said transmission range; but, in the event of a lower speed stage being engaged in said transmission range, no engine braking is made available. This increases the drivability of the vehicle during operation, and minimizes the risk of overrevving of the engine thereof.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

TABLE I

|  | $C_1$ (23) | $C_2$ (24) | $C_3$ (48) | $B_1$ (25) | $B_2$ (35) | $B_3$ (37) | $B_4$ (49) | $F_1$ (34) | $F_2$ (36) | $F_3$ (46) |
|---|---|---|---|---|---|---|---|---|---|---|
| DRIVE RANGE: | | | | | | | | | | |
| FIRST SPEED | E | D | D | D | D | D | D | O | (E) | (E) |
| SECOND SPEED | E | D | D | D | E | D | D | (E) | O | (E) |
| THIRD SPEED | E | D | E | D | E | D | D | (E) | O | O |
| FOURTH SPEED | E | E | E | D | E | D | D | O | O | O |
| THIRD RANGE: | | | | | | | | | | |
| FIRST SPEED | E | D | D | D | D | D | D | O | (E) | (E) |
| SECOND SPEED | E | D | D | E | E | D | D | e | O | (E) |
| THIRD SPEED | E | D | E | E | E | D | D | e | O | O |
| SECOND RANGE: | | | | | | | | | | |
| FIRST SPEED | E | D | D | D | D | D | E | O | (E) | e |
| SECOND SPEED | E | D | D | E | E | D | E | e | O | e |
| LOW RANGE: | | | | | | | | | | |
| FIRST SPEED | E | D | D | D | D | E | E | O | e | e |
| REVERSE RANGE | D | E | D | D | D | E | E | O | O | O |

TABLE II

|  | $P_1$ | $P_2$ | $P_3$ | $P_4$ | $P_5$ |
|---|---|---|---|---|---|
| DRIVE RANGE | X | O | O | O | O |
| 3 RANGE | X | X | O | O | O |
| 2 RANGE | X | X | X | O | O |
| L RANGE | X | X | X | X | O |
| R RANGE | O | O | O | O | X |

TABLE III

|  | First gear transmission mechanism 12 ratio | Driving/driven gears 53 and 54 ratio | Second gear transmission mechanism 13 ratio | Total overall gearing ratio |
|---|---|---|---|---|
| FIRST SPEED | 2.811 | 0.7 | 1.441 | 2.835 |
| SECOND SPEED | 1.549 | 0.7 | 1.441 | 1.562 |
| THIRD SPEED | 1.549 | 0.7 | 1.000 | 1.084 |
| FOURTH SPEED | 1.000 | 0.7 | 1.000 | 0.700 |
| REVERSE SPEED | 2.296 | 0.7 | 1.441 | 2.315 |

What is claimed is:

1. An automatic transmission for an automotive vehicle, comprising:
   (a) a fluid torque converter comprising a first rotational power input member and a first rotational power output member, said first rotational power input member and said first rotational power output member both being rotatable about a first axial line;
   (b) a first gear transmission mechanism comprising a second rotational power input member and a second rotational power output member and being selectively controllable to produce any one of a plurality of speed ratios between said second rotational power input member and said second rotational power output member, said second rotational power input member and said second rotational power output member both being rotatable about said first axial line, said second rotational power input member being rotationally connected to said first rotational power output member;
   (c) a second gear transmission mechanism comprising a third rotational power input member and a third rotational power output member and being selectively controllable to produce any one of a plurality of speed ratios between said third rotational power input member and said third rotational power output member, said third rotational power input member and said third rotational power output member both being rotatable about a second axial line parallel to said first axial line and displaced laterally therefrom;
   (d) a rotational power transfer mechanism comprising a first gear wheel drivingly connected with said second rotational power output member so as to be rotatable about said first axial line and a second gear wheel drivingly connected with said third rotational power input member so as to be rotatable about said second axial line and which transfers rotational power between said second rotational power output member and said third rotational power input member; and
   (e) a through lay shaft which extends along and is rotatable about said second axial line, which is drivingly connected with said third rotational power output member and which passes through said second gear transmission mechanism and said second gear wheel, said second gear wheel being rotatably supported primarily by said through lay shaft.

2. An automatic transmission according to claim 1, wherein said first gear transmission mechanism and said second gear transmission mechanism are each an underdrive mechanism which provides a directly connected mode as its highest speed stage, and said rotational power transfer mechanism is an overdrive mechanism.

3. An automatic transmission according to claim 1, wherein said first gear wheel and said second gear wheel in said rotational power transfer mechanism mesh directly with each other.

* * * * *